(12) United States Patent
Merjanian et al.

(10) Patent No.: US 11,798,200 B2
(45) Date of Patent: *Oct. 24, 2023

(54) SYSTEMS AND METHODS FOR PROVIDING AUGMENTED REALITY EMERGENCY RESPONSE SOLUTIONS

(71) Applicant: TITAN HEALTH & SECURITY TECHNOLOGIES, INC., Newport Beach, CA (US)

(72) Inventors: Vic Merjanian, Newport Beach, CA (US); Ryan Khalili, Newport Beach, CA (US); Eduardo Juarez, Newport Beach, CA (US); Ed Merjanian, Newport Beach, CA (US); Serene Nasser, Newport Beach, CA (US); Daniel Wallengren, Newport Beach, CA (US)

(73) Assignee: TITAN HEALTH & SECURITY TECHNOLOGIES, INC., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/168,666

(22) Filed: Feb. 5, 2021

(65) Prior Publication Data

US 2021/0409927 A1    Dec. 30, 2021

Related U.S. Application Data

(63) Continuation of application No. 15/860,630, filed on Jan. 2, 2018, now Pat. No. 10,952,058.

(51) Int. Cl.
*G09G 5/00*    (2006.01)
*G06T 11/00*    (2006.01)
(Continued)

(52) U.S. Cl.
CPC .......... *G06T 11/00* (2013.01); *G01C 21/3632* (2013.01); *G01C 21/3661* (2013.01);
(Continued)

(58) Field of Classification Search
CPC ....... H04W 4/90; H04W 4/02; H04W 64/006; G06V 20/20; G01C 21/3632;
(Continued)

(56) References Cited

U.S. PATENT DOCUMENTS 8,174,931 B2    5/2012  Vartanian et al.
9,097,554 B2    8/2015  Choi
(Continued)

FOREIGN PATENT DOCUMENTS

WO    WO 2017/008861    1/2017

OTHER PUBLICATIONS

Horowitz, Etan, "Point to your phone to ID places," http:www.orlandosentinel.com/business/orl-augmented-reality-hor01Mtz-092709-column.html; dated Sep. 29, 2009, 2 pages.

*Primary Examiner* — Abdul-Samad A Adediran
(74) *Attorney, Agent, or Firm* — Sheppard, Mullin, Richter & Hampton LLP

(57)    ABSTRACT

An emergency response system (ERS) configured to acquire equipment location data, target terminal location data, and emergency responder terminal location data; determine a horizontal distance measure between the emergency responder terminal and a select unit of equipment, determine a vertical distance measure between the emergency responder terminal and a select unit of equipment, engage a camera component of the emergency responder terminal to capture images of at least a portion of the surrounding real-world scene, providing such images for display on the touchscreen display of the emergency responder terminal, and/or providing an equipment display object for display on
(Continued)

the touchscreen of the emergency responder terminal such that, when an image provided for display spans a region of the real-world scene within which the equipment is located, the equipment display object dynamically overlays a segment of the image associated with the acquired equipment location data.

17 Claims, 13 Drawing Sheets

(51) Int. Cl.
| | |
|---|---|
| *H04W 4/90* | (2018.01) |
| *H04W 4/02* | (2018.01) |
| *G06T 11/60* | (2006.01) |
| *G06F 3/04842* | (2022.01) |
| *G01C 21/36* | (2006.01) |
| *G06F 3/0488* | (2022.01) |
| *H04W 64/00* | (2009.01) |
| *G06V 20/20* | (2022.01) |
| *G06V 10/10* | (2022.01) |

(52) U.S. Cl.
CPC ........ *G06F 3/0488* (2013.01); *G06F 3/04842* (2013.01); *G06T 11/60* (2013.01); *G06V 10/17* (2022.01); *G06V 20/20* (2022.01); *H04W 4/02* (2013.01); *H04W 4/90* (2018.02); *H04W 64/006* (2013.01); *G06T 2200/24* (2013.01)

(58) Field of Classification Search
CPC ............. G01C 21/3661; G06F 3/04842; G06F 3/0488; G06F 3/011; G06T 11/00; G06T 11/60; G06T 2200/24; G06Q 10/067; G06Q 30/0266; G08B 7/066
USPC ........ 367/118; 455/456.1; 705/7.21; 715/764
See application file for complete search history.

(56) References Cited

U.S. PATENT DOCUMENTS

| | | |
|---|---|---|
| 9,117,303 B2 | 8/2015 | Byrne et al. |
| 9,215,560 B1 | 12/2015 | Jernigan |
| 9,351,118 B2 | 5/2016 | Crutchfield |
| 9,571,723 B2 | 2/2017 | Velipasalar et al. |
| 9,646,419 B2 | 5/2017 | Bostick et al. |
| 2008/0314681 A1 | 12/2008 | Patel et al. |
| 2012/0087212 A1* | 4/2012 | Vartanian ........... G06Q 30/0266 367/118 |
| 2013/0053063 A1* | 2/2013 | McSheffrey ........... G08B 7/066 455/456.1 |
| 2013/0290899 A1* | 10/2013 | Amran .................. G06F 3/0488 715/764 |
| 2015/0125831 A1 | 5/2015 | Chandrashekhar Nair et al. |
| 2015/0287241 A1 | 10/2015 | Huston et al. |
| 2016/0117646 A1* | 4/2016 | Lerick ................. G06Q 10/067 705/7.21 |
| 2017/0219342 A1 | 8/2017 | Morioka |
| 2018/0129276 A1* | 5/2018 | Nguyen .................. G06F 3/011 |

* cited by examiner

SYSTEMS AND METHODS FOR PROVIDING AUGMENTED REALITY EMERGENCY RESPONSE SOLUTIONS

REFERENCE TO RELATED APPLICATION

The present application is a continuation of and claims priority to U.S. patent application Ser. No. 15/860,630, filed Jan. 2, 2018 and titled "SYSTEMS AND METHODS FOR PROVIDING AUGMENTED REALITY EMERGENCY RESPONSE SOLUTIONS," which is incorporated herein by reference in its entirety.

FIELD

The present disclosure relates generally to emergency response tools, and some embodiments relate more particularly to systems and methods for providing augmented reality emergency response solutions to aid emergency responders in providing timely and effective assistance to individuals in emergency situations.

BACKGROUND

In emergency situations it is often difficult for emergency responders to efficiently locate persons in need of assistance, to render appropriate aid to such persons, and to efficiently locate equipment that may be useful to render the appropriate aid to such persons. In general, there is a lack of information available to such responders when they need it most. In such situations, it can also be difficult for emergency response organizations to coordinate efforts to dispatch individual emergency responders, or groups of emergency responders, in an efficient and effective manner to assist the organization's members. The present disclosure addresses the deficiencies of conventional systems, and provides augmented reality based emergency response systems that aid emergency responders in: identifying locations of individuals in need of assistance (including real-time or near real-time location data); identifying locations of equipment that may be useful to render assistance to such individuals, identifying path information showing such individual's trail to arriving at their present location; identifying locations of individuals and/or equipment, tools, or other resources that may be useful for rendering aid in a given situation; establishing communications channels between emergency responders and persons in need of assistance; summoning additional assistance among users, emergency responders, emergency response entities, etc.; and various other features that enable more timely and effective assistance to persons in emergency situations.

SUMMARY OF THE EMBODIMENTS

In accordance with one or more embodiments of the present disclosure, an emergency response system (ERS) includes a non-transitory computer readable medium storing machine readable instructions which when executed cause the ERS to: acquire equipment location data for one or more units of equipment located in a zone of interest, the target terminal location data including a latitude measure, a longitude measure, and an altitude measure; wherein each of the one or more units of equipment is coupled with: a GPS circuit, an altimeter, and a communications circuit; acquire emergency responder terminal location data for at least one emergency responder terminal, the emergency responder terminal location data including a latitude measure, a longitude measure, and an altitude measure; wherein the at least one emergency responder terminal comprises: a GPS circuit, an altimeter, a camera component, a touchscreen display, a communication circuit, a processing engine, and a memory; determine a horizontal distance measure between the emergency responder terminal and each of the one or more units of equipment, the horizontal distance measure computed from acquired equipment location data and the acquired emergency responder terminal location data; determine a vertical distance measure between the emergency responder terminal and each of the units of equipment, the vertical distance measure computed from acquired equipment location data and the acquired emergency responder terminal location data; engage a camera component of the emergency responder terminal to capture images of at least a portion of the surrounding real-world scene, and provide such images for display on the touchscreen display of the emergency responder terminal; and/or provide an equipment display object for display on the touchscreen of the emergency responder terminal such that, when an image provided for display spans a region of the real-world scene within which a unit of equipment is located, the equipment display object overlays a segment of the image associated with the acquired equipment location data; whereupon selection of the equipment display object causes one or more equipment details to be displayed on the touchscreen display, the equipment details including one or more of an equipment type, an equipment quantity, and an equipment status.

In some embodiments, the non-transitory computer readable medium further stores machine readable instructions that, when executed, cause the ERS to: provide a route display object representing a suggested path of travel between the emergency responder terminal and the unit of equipment associated with the selected equipment display object. In some embodiments, the route display object is generated by an emergency management entity communicatively coupled with but physically detached from the emergency responder terminal. In some embodiments, the route includes an indication of the estimated time it will take the emergency responder to travel along the route.

In some embodiments, the equipment details associated with the unit of equipment includes one or more of: equipment type, equipment quantity, equipment operation status, an equipment use instruction.

In some embodiments, the non-transitory computer readable medium further stores machine readable instructions that, when executed, cause the ERS to: obtain updated equipment location data and emergency terminal location data on a continual basis, and correspondingly adjust the position of the equipment display object on the touchscreen display of the emergency responder terminal based on: changes to the equipment location data, changes to the emergency responder terminal location data, and changes in orientation of the camera component of the emergency responder terminal. In some embodiments, the non-transitory computer readable medium further stores machine readable instructions that, when executed, cause the ERS to: obtain updated equipment location data and emergency terminal location data on a periodic basis at predefined intervals, and correspondingly adjust the position of the target terminal display object on the touchscreen display of the emergency responder terminal based on: changes to the equipment location data, changes to the emergency responder terminal location data, and changes in orientation of the camera component of the emergency responder terminal. In still further embodiments, the non-transitory computer readable medium further stores machine readable instructions that, when executed, cause the ERS to: obtain updated equipment location data and emergency terminal location data upon manual request by a user, and correspondingly adjust the position of the target terminal display object on the touchscreen display of the emergency responder terminal based on: changes to the equipment location data, changes to the emergency responder terminal location data, and changes in orientation of the camera component of the emergency responder terminal.

In some embodiments, the equipment location data is obtained from one or more of: components at least partially internal to a housing of the unit of equipment, and components at least partially external to a housing of the unit of equipment. In some embodiments such components at least partially internal to the housing of the unit of equipment may include one or more of a GPS sensor, an altimeter, a Bluetooth beacon, and RFID tag, and a pressure sensor. In some embodiments such components at least partially external to the housing of the unit of equipment include one or more emergency vicinity components located in the vicinity of the scene of an ongoing emergency. In some embodiments such components at least partially external to the housing of the unit of equipment include one or more target vicinity components located in the vicinity of a at a scene of an ongoing emergency, wherein the target vicinity components include a plurality of proximity beacons configured to communicate with target terminals and a component of the unit of equipment.

In some embodiments, the horizontal distance measure between the emergency responder terminal and a given unit of equipment is given as an estimate of the shortest horizontal distance between the emergency responder terminal and the given unit of equipment. In some embodiments, the horizontal distance measure between the emergency responder terminal and the specified unit of equipment is given as an estimate of the total horizontal distance the emergency responder associated with the emergency responder terminal must travel to get to the unit of equipment if traveling along the suggested path of travel.

In some embodiments, the vertical distance measure is an estimate of the altitude of the target terminal. In some embodiments, the vertical distance measure is an estimate of the difference between the altitude of the unit of equipment and the altitude of the emergency responder terminal. In some embodiments, the route display object is provided upon selection of the equipment display object. In some embodiments, one or more of the shape, color, and size of the plurality of equipment display objects is defined based on one or more of a latitude measure, a longitude measure, an altitude measure, a route, an equipment detail, and an indication of the status associated with each one of the corresponding units of equipment.

Some implementations of the presently disclosed technology involve a method comprising the steps of: obtaining equipment location data for one or more units of equipment located in a zone of interest, the target terminal location data including a latitude measure, a longitude measure, and an altitude measure; wherein each of the one or more units of equipment is coupled with: a GPS circuit, an altimeter, and a communications circuit; obtaining emergency responder terminal location data for at least one emergency responder terminal, the emergency responder terminal location data including a latitude measure, a longitude measure, and an altitude measure; wherein the at least one emergency responder terminal comprises: a GPS circuit, an altimeter, a camera component, a touchscreen display, a communication circuit, a processing engine, and a memory; determining a horizontal distance measure between the emergency responder terminal and each of the one or more units of equipment, the horizontal distance measure computed from acquired equipment location data and the acquired emergency responder terminal location data; determining a vertical distance measure between the emergency responder terminal and each of the units of equipment, the vertical distance measure computed from acquired equipment location data and the acquired emergency responder terminal location data; engaging a camera component of the emergency responder terminal to capture images of at least a portion of the surrounding real-world scene, and provide such images for display on the touchscreen display of the emergency responder terminal; providing an equipment display object for display on the touchscreen of the emergency responder terminal such that, when an image provided for display spans a region of the real-world scene within which a unit of equipment is located, the equipment display object overlays a segment of the image associated with the acquired equipment location data; whereupon selection of the equipment display object causes one or more equipment details to be displayed on the touchscreen display, the equipment details including one or more of an equipment type, an equipment quantity, and an equipment status; and/or providing a route display object delineating a path of travel between the emergency responder terminal and the unit of equipment.

In accordance with one or more embodiments of the present disclosure, an emergency response system (ERS) includes a non-transitory computer readable medium storing machine readable instructions which when executed by a processor cause one or more elements of the ERS to: acquire target terminal location data for a plurality of target terminals, the target terminal location data including a latitude measure, a longitude measure, and an altitude measure; wherein each of the plurality of target terminals comprise: a GPS circuit, an altimeter, and a communications circuit; and/or acquire emergency responder terminal location data for at least one emergency responder terminal, the emergency responder terminal location data including a latitude measure, a longitude measure, and an altitude measure; wherein the at least one emergency responder terminal comprises: a GPS circuit, an altimeter, a camera component, a touchscreen display, a communication circuit, a processing engine, and a memory; and/or determine a horizontal distance measure between the emergency responder terminal and each of the plurality of target terminals, the horizontal distance measure computed from acquired target terminal location data and the acquired emergency responder terminal location data; and/or determine a vertical distance measure between the emergency responder terminal and each of the plurality of target terminals, the vertical distance measure computed from acquired target terminal location data and the acquired emergency responder terminal location data; and/or engage a camera component of the emergency responder terminal to capture images of at least a portion of the surrounding real-world scene; and/or provide such images for display on the touchscreen display of the emergency responder terminal; and/or provide a target terminal display object for display on the touchscreen of the emergency responder terminal such that, when an image provided for display spans a region of the real-world scene within which a target terminal is located, the target terminal display object overlays a segment of the image associated with the acquired target terminal location data; and/or whereupon selection of the target terminal display object causes registered user details to be displayed on the touchscreen display, the registered user details including a physical characteristic.

In some embodiments, the non-transitory computer readable medium further stores machine readable instructions that, when executed by a processor, cause the ERS to: transmit a mission assignment to the emergency responder to render assistance to a specific target among the plurality of targets, the mission assignment based on: registered user details about the users of the plurality of target terminals, registered user details about the user of the emergency responder terminal, and priority scores among the plurality of target terminals; and/or provide a mission route display object representing a suggested path of travel between the emergency responder terminal and the specific target terminal.

In some embodiments, the mission assignment is generated by an emergency management entity communicatively coupled with but physically detached from the emergency responder terminal. In some embodiments, the mission route display object is provided upon selection of the target terminal display object.

In some embodiments, the registered user details associated with the users of the plurality of target terminals may include one or more of: age, gender, height, weight, activity level, physical fitness levels, health conditions, public figure status, occupation, photograph, marital status, number of children, number of siblings, language skills, tactical training skills, medical training, and organ donor information.

In some embodiments, the registered user details associated with the user of the emergency responder terminal may include one or more of: skills, training level, training type, seniority, years of experience, working shift hours, age, gender, height, weight, activity level, physical fitness levels, health conditions, photograph, marital status, number of children, number of siblings, language proficiencies, tactical training skills, medical training, and organ, donor information.

In some embodiments, the priority scores among the plurality of target terminals are determined based on one or more of: situational status information associated with individual target terminals, and situational status information associated with the emergency responder terminal. In some embodiments, the mission assignment includes an indication of the temporal urgency of the mission.

In some embodiments, the non-transitory computer readable medium further stores machine readable instructions that, when executed, cause the ERS to: obtain updated target terminal location data and emergency terminal location data on a continual basis, and correspondingly adjust the position of the target terminal display object on the touchscreen display of the emergency responder terminal based on: changes to the target terminal location data, changes to the emergency responder terminal location data, and changes in orientation of the camera component of the emergency responder terminal.

In some embodiments, the non-transitory computer readable medium further stores machine readable instructions that, when executed, cause the ERS to: obtain updated target terminal location data and emergency terminal location data on a periodic basis at predefined intervals, and correspondingly adjust the position of the target terminal display object on the touchscreen display of the emergency responder terminal based on: changes to the target terminal location data, changes to the emergency responder terminal location data, and changes in orientation of the camera component of the emergency responder terminal. In some embodiments, the non-transitory computer readable medium further stores machine readable instructions that, when executed, cause the ERS to: obtain updated target terminal location data and emergency terminal location data upon manual request by a user, and/or correspondingly adjust the position of the target terminal display object on the touchscreen display of the emergency responder terminal based on: changes to the target terminal location data, changes to the emergency responder terminal location data, and changes in orientation of the camera component of the emergency responder terminal.

In some embodiments, the target terminal location data is obtained from one or more of: components internal to a housing of the target terminal, components external to a housing of the target terminal, selection input from a user of the target terminal; textual input from a user of the target terminal, voice input from a user of the target terminal; and video input from a user of the target terminal.

In some embodiments, the components internal to the housing of the target terminal may include one or more of a GPS sensor (e.g., a GPS circuit), an altimeter, and a pressure sensor. The components external to the housing of the target terminal may include one or more target vicinity components located in the vicinity of the target at a scene of an ongoing emergency. The components external to the housing of the target terminal may include one or more target vicinity components located in the vicinity of the target at a scene of an ongoing emergency, wherein the target vicinity components include a plurality of proximity beacons configured to communicate with target terminals.

In some embodiments, horizontal distance measure between the emergency responder terminal and a given target terminal is given as an estimate of the shortest horizontal distance between the emergency responder terminal and the given target terminal. In some embodiments, the horizontal distance measure between the emergency responder terminal and the specified target terminal is given as an estimate of the total horizontal distance the emergency responder associated with the emergency responder terminal must travel to get to the user associated with the given target terminal if traveling along the suggested path of travel. In some embodiments, the vertical distance measure is an estimate of the altitude of the target terminal. In some embodiments, the vertical distance measure is an estimate of the difference between the altitude of the target terminal and the altitude of the emergency responder terminal.

In some embodiments, the non-transitory computer readable medium further stores machine readable instructions that, when executed, cause the ERS to: establish one or more of an audio, video or text based communication channel with the target terminal. In some embodiments, one or more of the shape, color, and size of the plurality of terminal display objects is defined based on one or more of a latitude measure, a longitude measure, an altitude measure, a priority score, a mission assignment, situational status information, and an indication of temporal urgency associated with each one of the corresponding plurality of target terminals.

In accordance with one or more embodiments, the present disclosure herein includes a method comprising the steps of: obtaining target terminal location data for a plurality of target terminals, the target terminal location data including a latitude measure, a longitude measure, and an altitude measure; wherein each of the plurality of target terminals comprise: a GPS circuit, an altimeter, and a communications circuit; and/or obtaining emergency responder terminal location data for at least one emergency responder terminal, the emergency responder terminal location data including a latitude measure, a longitude measure, and an altitude measure; wherein the at least one emergency responder terminal comprises: a GPS circuit, an altimeter, a camera component, a touchscreen display, a communication circuit, a processing engine, and a memory; and/or determining a horizontal distance measure between the emergency responder terminal and each of the plurality of target terminals, the horizontal distance measure computed from acquired target terminal location data and the acquired emergency responder terminal location data; and/or determining a vertical distance measure between the emergency responder terminal and each of the plurality of target terminals, the vertical distance measure computed from acquired target terminal location data and the acquired emergency responder terminal location data; and/or engaging a camera component of the emergency responder terminal to capture images of at least a portion of the surrounding real-world scene, and providing such images for display on the touchscreen display of the emergency responder terminal; and/or providing a target terminal display object for display on the touchscreen of the emergency responder terminal such that, when an image provided for display spans a region of the real-world scene within which a target terminal is located, the target terminal display object overlays a segment of the image associated with the acquired target terminal location data; whereupon selection of the target terminal display object causes registered user details to be displayed on the touchscreen display, the registered user details including a physical characteristic.

In accordance with one or more embodiments of the present disclosure, the technology herein involves a method that may include the steps of: obtaining location data associated with at least one of a plurality of target terminals, the location data including one or more of: a latitude position measure, a longitude position measure, and a vertical position measure; and/or determining a horizontal distance measure associated with the at least one of the target terminals, the horizontal distance measure based on one or more of the latitude position measure, the longitude position measure, and the vertical position measure; and/or determining a vertical distance measure associated with the at least one of the target terminals, the vertical distance measure based on one or more of the latitude position measure, the longitude position measure, and the vertical position measure; and/or defining a selectable display object associated with the location data associated with the at least one of the target terminals; and/or engaging the camera component to capture one or more images of at least a portion of the real-world scene surrounding the at least one of a plurality of emergency responder terminals, and provide in real-time the one or more images for display on the touchscreen display of the at least one of the emergency responder terminals; and/or providing the selectable display object for display on the touchscreen of the at least one of the emergency responder terminals when the image provided for display spans a region of the real-world scene associated with an estimated real-world location of the at least one of the target terminals, the selectable display object provided for display in a position on the touchscreen such that it overlays a segment of the image associated with the region; and/or generating a mission assignment, the mission assignment based on one or more of: registered user details associated with the user of the target terminal, registered user details associated with the user of the emergency responder terminal, and a priority score of the target terminal among the plurality of target terminals; and/or providing a mission route display object delineating a path of travel between the emergency responder terminal and the assigned target terminal.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "front," "back," "bottom" or "side" views, such references are merely descriptive and do not imply or require that the disclosed technology be implemented or used in a particular spatial orientation unless explicitly stated otherwise.

The figures are not intended to be exhaustive or to limit the disclosed technology to the precise form disclosed. It should be understood that the invention can be practiced with modification and alteration, and that the disclosed technology be limited only by the claims and the equivalents thereof.

DETAILED DESCRIPTION

Embodiments of the present disclosure provide augmented reality based emergency response systems that aid emergency responders in identifying real-time or near real-time locations of individuals in need of assistance, and in providing timely and effective assistance to such individuals.

Figure 1:
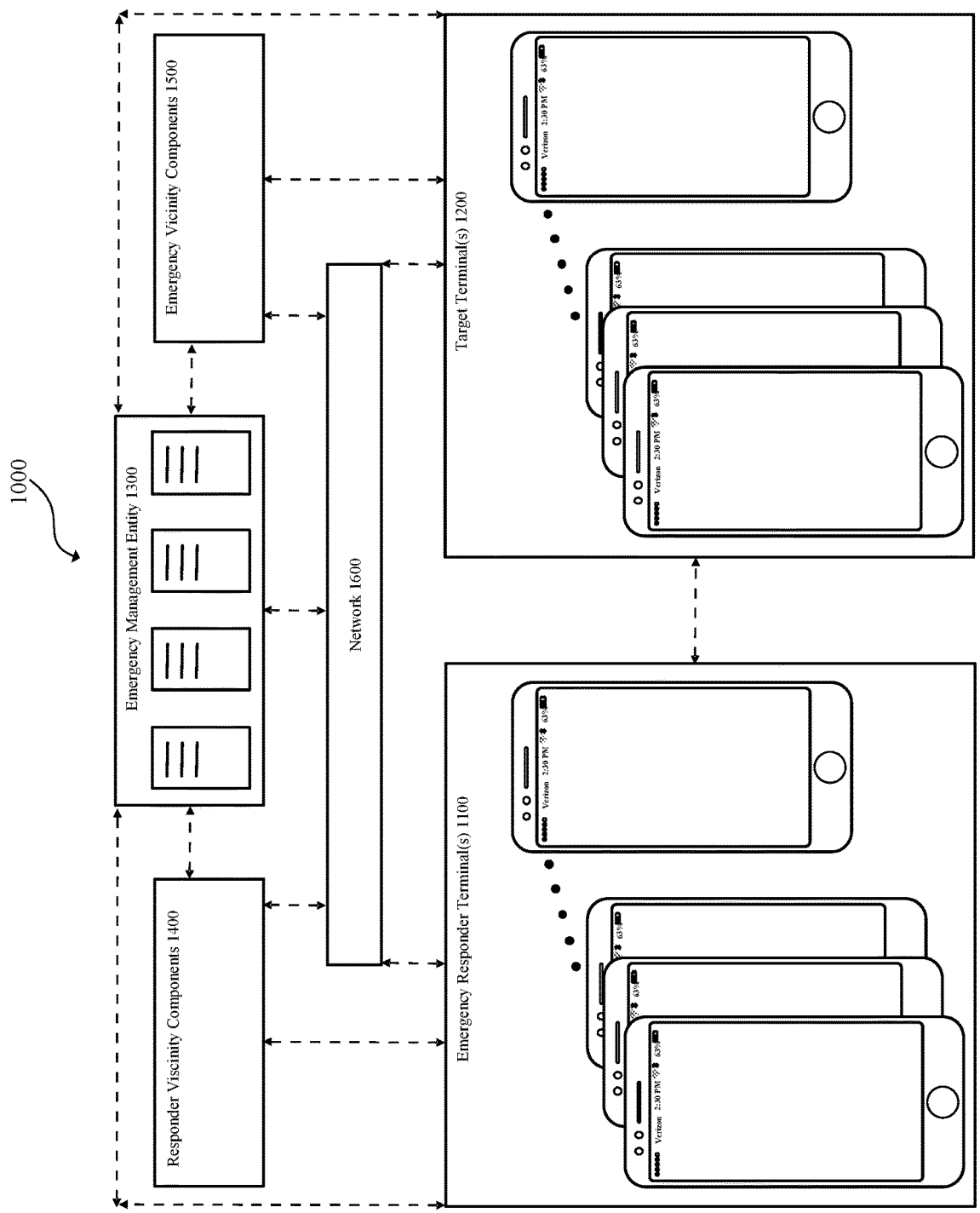
FIG. 1 is a block diagram illustrating an example emergency response management system in accordance with one or more embodiments of the present disclosure.

FIG. 1 is a block diagram illustrating an example emergency response system in accordance with one or more embodiments of the disclosed technology. As shown, emergency response system 1000 (hereafter, system 1000) may include one or more emergency responder terminals 1100 and one or more target terminals 1200 in communication with an emergency management entity 1300 (hereinafter "EME 1300"). EME 1300 and emergency responder terminals 1100 may further be in communication with responder vicinity components 1400, and other components. EME 1300 and target terminals 1200 may further be in communication with emergency vicinity components 1500, and other components. As shown, the communication between one or more of: emergency responder terminals 1000, target terminals 1200, emergency management entity 1300, responder vicinity components 1400, and emergency vicinity components 1500 may occur, directly or indirectly, over any one or more communications links (e.g., wired or wireless connections) including via one or more networks 1600 (e.g., cellular network, Bluetooth® network, ZigBee® network, Wi-Fi® network, etc.), inclusive of the hardware and software required to establish such a communications link (e.g., communications interfaces such as cellular chipsets, Bluetooth® modules, ZigBee® modules, Wi-Fi modules, etc.).

System 1000 may obtain location information of one or more target terminals 1200 within (or associated with) a zone of interest; obtain location information of one or more emergency responder terminals 1100 responsible for the zone of interest; provide location information of one or more target terminals 1200 to the one or more emergency responder terminals 1100; and/or present an augmented reality display object on the display of the emergency responder terminals 1100, the augmented reality display object overlaying one or more regions of one or more images representing a zone of interest (or portion of the zone of interest), the regions overlaid by one or more augmented reality objects corresponding to respective target terminal 1200 locations in the real-world scene being captured by the emergency responder terminal 1100's camera component.

In some embodiments, system 1000 may obtain location information of one or more pieces of equipment within (or associated with) the zone of interest; provide location information of one or more pieces of equipment to the one or more emergency responder terminals 1100; present an augmented reality display object on the display of the emergency responder terminals 1100, the augmented reality display object overlaying one or more regions of one or more images representing a zone of interest (or portion of the zone of interest), the regions overlaid by one or more augmented reality objects corresponding to respective locations of the one or more pieces of equipment within the real-world scene being captured by the emergency responder terminal 1100's camera component.

Figure 2:
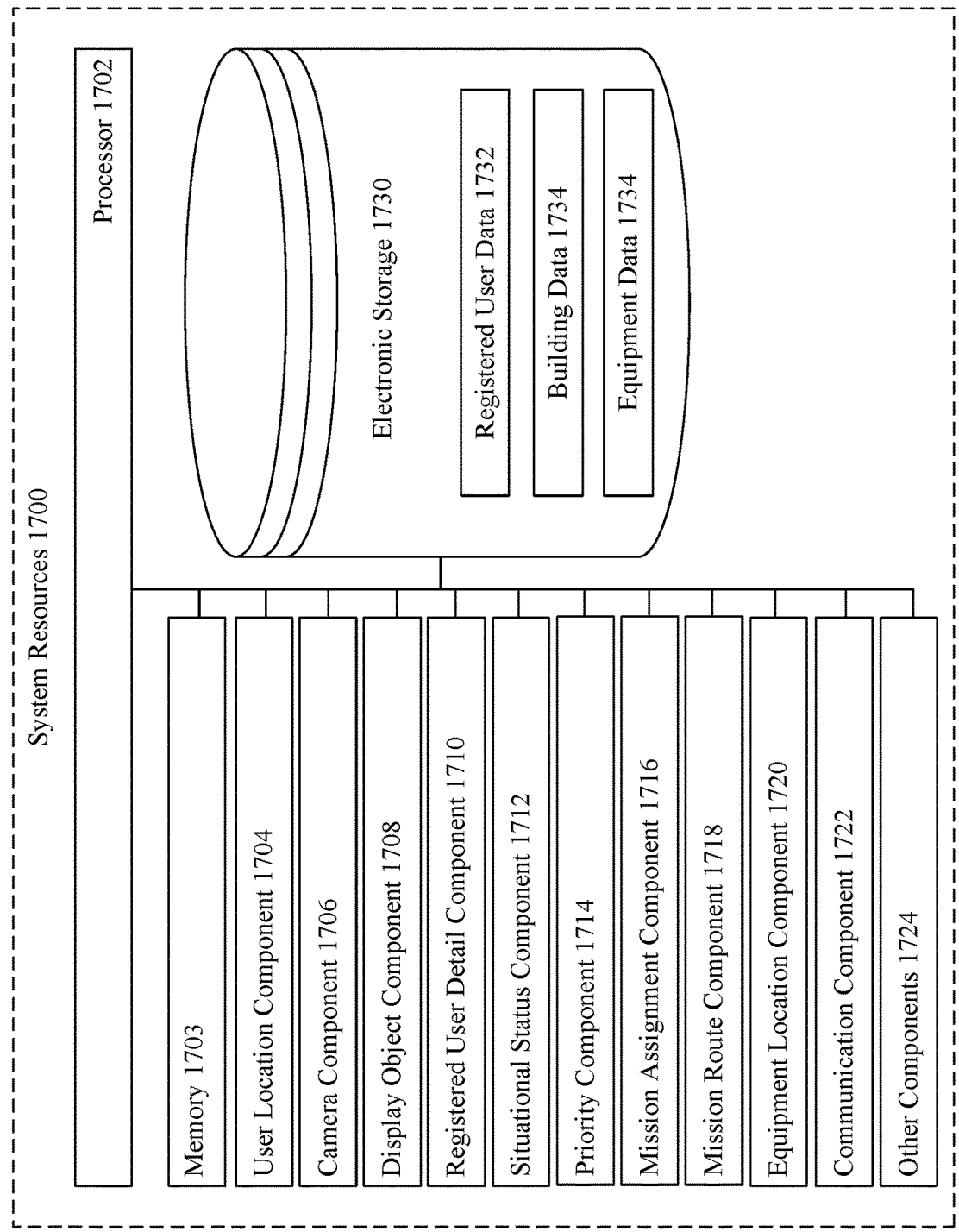
FIG. 2 is a block diagram illustrating an example system emergency management entity in accordance with one or more embodiments of the present disclosure.

As shown in FIG. 1, emergency responder terminals 1100 and target terminals 1200 may be mobile computing devices such as, for example, smartphones (as shown in FIG. 1), tablets, netbooks, laptop computers, or any other mobile terminal able to communicate over a wired or wireless network. EME 1300 may be a computing device such as a server, a database, a computer, a workstation, a computing terminal, a mobile telecommunications device, an electronic storage device, a computing platform, or other computing resource. Emergency responder terminals 1000, target terminals 1200, and EME 1300 may include one or more computing resources available to, and in some embodiments considered part of, system 1000. The various features and technology disclosed herein may be effectuated by one or more of the computing resources of system 1000, whether by the computing resources of a particular device (e.g., an emergency responder terminal), or by the computing resources of several devices performing operations in concert with one another such as may the case in a distributed computing arrangement among the computing resources of multiple devices (duplicative, parallel, or distributed computing of both an emergency management entity and an emergency responder terminal function or feature). Some such computing resources are shown in FIG. 2 discussed herein.

Referring still to FIG. 1, emergency responder terminals 1100 and/or target terminals 1200 may run an emergency management application (hereafter "Emergency App"), though in some embodiments it may not be necessary for the target terminals 1200 to run a mobile application to be operable within system 1000. In some embodiments, Emergency App runs on EME 1300 as a virtual resource accessible to emergency responder terminals 1100 and/or target terminals 1200. Emergency App may facilitate access to one or more resources of the emergency responder terminals 1100, target terminals 1200, EME 1300, Responder Vicinity Components 1400, Emergency Vicinity Components 1500, and may provide, distribute, or otherwise convey data obtained via any one or more of such resources to one or more others of such resources.

In some embodiments, the Emergency App provides a GUI to display information to the user of a terminal, and may be further adapted to receive user input that may be conveyed throughout system 1000, including for example, to EME 1300, to other terminals, to responder vicinity components 1400, to emergency vicinity components 1500, etc. As one of ordinary skill in the art will appreciate, EME 1300 may include one or more APIs providing a software interface between terminals and the resources of EME 300.

In some embodiments, Emergency App may utilize or access telephony, SMS, camera, voice, data and other resources of emergency responder terminals 1100, target terminals 1200, responder vicinity components 1400, and/or emergency vicinity components 1500. For example, an emergency responder may select an icon on the GUI of the Emergency App to open a two-way communication channel between their emergency responder terminal 1100 and another terminal such as a particular target terminal 1200 or group of target terminals 1200, or another emergency responder terminal 1100 such as the emergency responder terminal of an emergency response unit's captain/supervisor. Such communications may include SMS text messaging conversations, video messaging, Picture messaging, in-app messaging conversations, a voice call, a video conference, etc.

In another example, an emergency responder may select an icon or menu item on the GUI of the Emergency App to activate a resource of a target terminal 1200 to assist the emergency responder in locating the target terminal 1200. For instance, an emergency responder may activate a speaker of a target terminal to propagate an alarm sound to help the emergency responder find the target terminal (and ultimately the user associated with the target terminal) as they near the location identified by system 1000. Likewise, and emergency responder may activate a light source (e.g., an LED) of the target terminal to propagate a flashing light to help the emergency responder find the target terminal (and ultimately the user associate with the target terminal).

FIG. 2 is a diagram illustrating example resources of system 1000 in accordance with one or more embodiments of the disclosed technology, resources that are not explicitly shown in FIG. 1. As shown system resources 1700 may include one or more processing engines (represented symbolically by processor 1702), one or more memories (represented symbolically by memory 1703), and one or more electronic storage units (represented symbolically by electronic storage 1730). Memory 1703 may be configured with machine readable instructions which, when executed by processor 1702, cause system 1000 to effectuate one or more features discussed below with respect to elements identified by numerals 1704-1724 (which may be embodied in or effectuated by one or more of emergency responder terminals 1100, target terminals 1200, responder vicinity components 1400, emergency management entities 1300, emergency vicinity components 1500). System resources 1700 may include one or more of a user location component 1704, camera component 1706, display object component 1708, registered user detail component 1710, situational status component 1712, priority component 1714, mission assignment component 1716, mission route component 1718, an equipment location component 1720, communication component 1722, and other components 1724.

A user location component 1704 in accordance with one or more embodiments of the present disclosure obtains location data of one or more emergency responder terminals 1100 and target terminals 1200. In some embodiments such data may be obtained via location resources (e.g., location circuitry) local to such terminals, and may be provided to system 1000 over network 1600. User location data is indicative of the geospatial location of one or more of the emergency responder terminals 1100 and target terminals 1200 associated with or connected to system 1000 (collectively, "units").

User location component 1704 may include components included in terminals (e.g., terminal local resources), components included in emergency management entity (e.g., communications modules, machine-readable instructions), or both. In accordance with one or more embodiments of the present disclosure, system 1000 may obtain location data by actively transmitting a location data request to one or more of the units, thereby prompting the one or more units to access local location resources (e.g., GPS modules, altimeter, barometer, beacons, etc.) to obtain location information and generate and transmit a data packet containing the location data (e.g., location details) to a computing resource of system 1000. For instance, EME 1300 of system 1000 may receive a responsive transmission from the one or more units containing the one or more units' respective location data, and system 1000 may propagate and/or store such information within an electronic storage or memory of system 1000 as desired for a particular application or by a particular resource coupled to or within system 1000.

Location data may indicate geospatial location of a user associated with the unit, including longitude and latitude coordinates, degrees/minutes/seconds location parameters, altitude above sea level, altitude above ground level, etc. User location component 1704 may be utilized to identify geospatial location of a user. User location component 1704 may comprise one or more circuits, modules, or chips local to the units themselves. For example, location component 1704 may include a GPS sensor (e.g., a GPS circuit), an altimeter, a pressure sensor (e.g., a barometer), and the like. In some embodiments user location component 1704 may further comprise hardware and software operating on EME 1300 and communicatively coupled with location sensors of one or more units.

Location data may also indicate structure specific location details of a user, including location within or upon a structure whose dimensions or other parameters are known to or derivable by system 1000. For example, if a large office building implements system 1000 for emergency situations, the building operator may choose to install one or more emergency vicinity components 1500 throughout the building to enhance location data provided to system 1000. In some embodiments emergency vicinity components 1500 provide location data as an alternative to, or as an enhancement to, the location data obtained by the location componentry local to a unit. Emergency vicinity components 1500 may include any one or more of: location beacons, proximity sensors, receivers, etc. installed throughout the building structure (on each floor, for example), that may provide structure specific location details that may be relevant to a particular application.

For example, extending the example of an office building implementing system 1000, suppose the building operator chooses to install location beacons or receivers throughout each of its twenty floors. The beacons may transmit and/or receive signals to/from units within a predefined vicinity of the beacon's location (e.g., within 20 feet of the beacon, for example), and may provide location component 1704 of system 1000 with information about which units are within its vicinity. Individual beacons reporting to system resources 1800 may be associated with a particular location in the building (e.g., beacon may be associated with conference room D on the north side of the building on the $6^{th}$ floor). Such information may be pre-registered or otherwise provided in advance to system resources 1800 as building data 1734 or electronic storage 1730). Thus, if a registered user, Clayton, has his smartphone (target terminal 1200) with him and both were located in conference room D on the north side of the building on the $6^{th}$ floor when an emergency situation arose (e.g., a fire in the building), user location component 1704 may obtain an indication, directly or indirectly, from the location beacon that Clayton was located on the 6th floor on the north side of the building in conference room D. As much information as desired about a building or other structure, or about any of the emergency vicinity components 1500, may be registered or otherwise entered and stored as building data 1734 on system resources (e.g., electronic storage 1730, which may reside for example at the EME 1300 that is operably connected to emergency responder terminals and/or target terminals). This way, location information available to system 1000 may be enhanced with as much detail as desired for a given application or as desired by a given operation.

In still a further example, and as discussed further hereafter with respect to equipment location component 1722, in some embodiments emergency vicinity components 1500 include location beacons, proximity sensors, receivers, RFID tags, or any of the elements discussed herein with respect to terminals (e.g., GPS circuit, altimeter, barometer, etc.), installed in an indoor location where a piece of usable equipment is stowed within the building, and/or an outdoor location where a piece of usable equipment is kept. Such equipment may include, for example, a fire extinguisher, an epinephrine pen (EpiPen), an axe, an oxygen mask, a defibrillator, a hose, a fire alarm, a fire hydrant, a hose, a rope, etc. In some instances, such location beacons, proximity sensors, receivers, RFID tags, GPS circuits, altimeters, barometers, etc. may be affixed to the item of equipment itself (or the housing or casing associated with such equipment) and may provide location data to system 1000 such that an emergency responder terminal may obtain a view of equipment in the vicinity of the emergency. Indeed, in some embodiments one or more emergency vicinity components 1500 may embody any and all of the technology and features discussed herein with respect to target terminals, but instead of being associated with a user the components are associated (and in some instances mechanically coupled) with a piece of equipment.

In some instances, similar to the terminals of the present disclosure, such emergency vicinity components associated with a piece of equipment may include hardware, such as a speaker or light source, that may aid an emergency responder or other user (e.g., a user associated with a target terminal) in locating the piece of equipment.

For example, an emergency responder may select an icon or menu item on the GUI of the Emergency App running on their terminal to activate, directly or indirectly, a resource of an emergency vicinity component such as a speaker or light source coupled to a Bluetooth low energy proximity beacon tied to a desired piece of equipment, for example, to assist the emergency responder in locating the desired piece of equipment in a given building. The speaker may propagate an alarm sound, or the light source may propagate a flashing light, for example, to help the emergency responder find the desired equipment. Similarly, features discussed herein with respect to target terminals (and associated users) may be implemented in connection with either or both of a responder vicinity components 1400 or an emergency vicinity components 1500 (and associated equipment, for example), and any information obtained therefrom. For example, just as system 1000 may provide additional details about a target terminal (the target user associated with the terminal), a route to a target terminal's location, a status of a target or target terminal, etc., system 1000 may also provide additional details about an emergency vicinity component (e.g., identify the piece of equipment associated with the emergency vicinity component), a route to the location of a piece of equipment associated with emergency vicinity component, a status of an emergency vicinity component or a piece of equipment with which it is associated.

Although features herein are often discussed with respect to one or the other of responder vicinity components 1400 and emergency vicinity components 1500, the same or similar features discussed with respect to one may be implemented with respect to the other.

Referring still to FIGS. 1 and 2, Emergency App may utilize or operate one or more resources of system 1000, including resources of emergency responder terminals 1100, target terminals 1200, responder vicinity components 1400, EME 1300, and/or emergency vicinity components 1500. For example, Emergency App may utilize or operate a camera component 1706 of an emergency responder terminal 1100 or target terminal 1200 to capture a portion of a real-world scene within the field of view of the camera lens and CMOS array of the respective device.

Display object component 1708 may define display objects associated with target terminals 1200 and/or emergency responder terminals 1100 whose location data has been obtained by system 1000 via one or more system resources 1800. A display object may include any graphic (e.g., a pin, a bubble, a tile) that may be displayed on an electronic display. Display object component 1708 may determine when a portion of a real-world scene captured by a camera component 1706 of an emergency responder terminal 1100 captures a region of space wherein a target terminal 1200 and/or other emergency responder terminals 1100 are located. As one or more portions of the real-world scene captured is provided on the display of the emergency responder terminal 1100 (e.g., as a user scans the camera over a scene), display object component 1708 may cause the display objects corresponding to target terminals 1200 and/or other emergency responder terminals 1100 falling within the scene to be displayed such that they overlay the real-world scene images in a manner (e.g., on a region of the image) that identifies the location of respective target terminals 1200 and/or other emergency responder terminals 1100 within the real-world scene as it is displayed on the display of the given emergency responder terminal 1100.

In some embodiments, display object component 1708 defines a display object associated with emergency responder terminals 1100 whose location data has been obtained by system 1000 via one or more system resources 1800. A display object may include any graphic (e.g., a pin, a bubble, a tile) that may be displayed on an electronic display. Display object component 1708 may determine when a portion of a real-world scene captured by a camera component 1706 of a target terminal 1200 captures a region of space wherein an emergency responder terminal 1100 and/or other target terminals 1200 is located. As one or more portions of the real-world scene captured is provided on the display of the target terminal 1100 (e.g., as a user scans the camera over a scene), display object component 1708 may cause the display objects corresponding to emergency responder terminals 1100 and/or other target terminals 1200 falling within the scene to be displayed such that they overlay the real-world scene images in a manner (e.g., on a region of the image) that identifies the location of respective emergency responder terminals 1100 and/or other target terminals 1200 within the real-world scene as it is displayed on the display of the given target terminal 1200.

Registered user detail component 1710 obtains information stored in a user profile for one or more registered users. Such information may be provided by a user when first creating a user profile upon registering with system 1000 (e.g., registration and sign-up via Emergency App). Such information may include the user's name, age, gender, height, weight, contact information (phone, email, etc.), contact information preferences, emergency contact information, family information (spouse, children, siblings, parents, etc.), employment information, skillset, completed emergency response trainings (e.g., CPR certified, tactical training, bomb deactivation training), health conditions or tendencies (e.g., diabetes, asthma, claustrophobia, etc.), physical disabilities (e.g., visually impaired, hearing impaired, paraplegic, etc). Such information may also include a categorical designation. The categorical designation may be as simple as selecting either an "emergency responder" (e.g., responder) category or a "standard user" category (e.g., potential target). Such information may further include details about the device the user designates as their primary terminal—e.g., emergency responder terminal, target terminal. Any and all such information may be stored in any electronic storage available to system 1000, such as in a registered user data 1732 sector of electronic storage 1730.

In some embodiments, emergency responder terminals 1100 and target terminals 1200 are distinguished from one another by the category of registered users with which they are associated as stored in the user profiles for the one or more registered users. According to some embodiments, emergency responder terminals 1100 are associated with a category of registered users designated as emergency responders (e.g., persons or other entities charged with responding to an emergency situation, resolving an emergency situation, or assisting others who are involved in an emergency situation). According to some embodiments, target terminals 1200 are associated with a category of potential target (e.g., a standard user of or subscriber to system 1000).

Emergency responders may include public individuals, groups, or entities. For instance, public emergency responders might include: a police department, a division of a police department (e.g., a task force, bomb squad, etc.), an individual police officer or group of police officers; a fire department, a division of a fire department, an individual fireman or group of firemen; a federal law enforcement agency (FBI, CIA, etc.), a division of a federal law enforcement agency, or an individual field officer or team of field officers; a local poison control department, a division of a local poison control department, an individual poison control agent or group of agents; or any other public entity, individual, or group of individuals designated as such, and the like. Emergency responders may also include private individuals, groups, or entities. For instance, private emergency responders might include security guards, property patrolmen, or any other private entity, individual, or group of individuals designated as such, and the like.

In some embodiments, the emergency responders category may be further divided into subcategories that have different privileges, permissions, or capabilities to interact with and control one or more aspects of system 1000. In some embodiments the subcategories may correspond to the hierarchical structure relevant to a group of emergency responders. For example, the emergency responders in a particular scenario might include a local police task force. The task force might be made up of one commander, one managing officer that reports to the commander, and five field officers that report to the managing officer. In such a scenario, subcategories might include: "commanders," "managing officers," and "field officers," with descending privileges, permissions, or capabilities to interact with and control one or more aspects of system 1000. Various applications will be made apparent upon review of the entire disclosure herein.

According to some embodiments, target terminals 1200 are associated with any non-emergency responder category of registered users, which may include but not be limited to registered users or entities that are in danger, are involved in an emergency situation, or which are otherwise in need of assistance from an emergency responder. Just as emergency responders may be further divided into subcategories that have different privileges, permissions, or capabilities to interact with and control one or more aspects of system 1000, so too can the non-emergency responder category. For instance, if a school campus were to adopt an embodiment of system 1000 and the school campus were to be under lockdown because of a bomb threat, the subcategories of registered users within the non-emergency responder category may include the school's dean, administrators, teachers, students, and visitors. Each may be given different privileges, permissions, or capabilities to interact with and control one or more aspects of system 1000. Various applications will become apparent upon review of the entire disclosure herein.

Situational status component 1712 obtains situational status information in real-time from users in emergency situations. Situational status information may include any information that provides additional context about the nature of the situation within the vicinity of a given user—e.g., number of other people in the same vicinity as the user having the target terminal, an injury sustained by the user having the target terminal (or a person in the vicinity), a reaction being experienced by the user of the target terminal (or a person in the vicinity), a request for specific type of help needed or number of responders needed, and/or images, sounds, or video of the vicinity.

Such situational status information may be provided as preconfigured messages/data the user can automatically send by tapping or otherwise selecting an associated buttons, icon or tile from their Emergency App, for example, or may be customized messages/data the user types or records into their unit via their Emergency App, for example. Examples of buttons, icons, or tiles that may be useful to transmit preconfigured messages via the target terminal version of the app may include one or more of the following: "CPR Needed," or "Immobilized," or "Children in Vicinity," "Move on to other targets," and the like. Example customized messages the target terminals may transmit may include messages typed by the user of the unit, such as: "There is a person in my vicinity in need of CPR, please send CPR certified emergency responder as soon as possible," or "I am in the vicinity of the emergency but there is a clear path for my escape, no need to assist me, move on to others," or "I am trapped and cannot find an exit," or, "I've injured my leg and am immobile, please send two or more emergency responders to carry me out," or "the smoke from the fire is becoming unbearable, people around me are losing consciousness and I expect I will shortly too," and the like.

Examples of buttons, icons, or tiles that may be useful for the emergency responder terminal version of tan Emergency App may include one or more of the following: "Send additional responders," or "Mission Assignment Completed," or "Available for New Mission Assignment," and the like. Example customized messages the emergency responder terminals may transmit may include messages typed by the user of the unit, such as: "I need three more emergency responders at my present location," or "The person I came to assist was passed out when I arrived, please send another responder with medical training within the next 10 minutes," or "the south exit of the building is blocked by a pillar that has fallen in front of the exit," and the like.

Situation status component 1712 may actively inquire about such situational status information (e.g., transmit requests for information), may passively remain open to receiving any such information that is transmitted by a unit (e.g., a receiver configured to receive signal transmissions from units), or both.

Priority component 1714 may determine a priority for one or more target terminals 1100 among a plurality of target terminals 100. Priority may be determined by applying one or more predefined priority criteria, such priority criteria based upon one or more of user location information, equipment location information, registered user detail information, and situational status information. Priority criteria may be defined in any manner. For example, priority criteria may include an expression that computes a weighted score for each target terminal under consideration, and rank the imminence of the need to assist the targets based on the score. For example, a priority criteria may be given by the expression:

PRIORITY SCORE=(Factor1*w1)+(Factor2*w2)+ . . . +(FactorN*wN)  [1]

For example, suppose that an implementation of system 1000 considers two different factors in determining priority. Suppose, in this example, that Factor1 represents a score based on the time within which assistance must be rendered, and Factor2 represents a score based on whether there are children in the vicinity of a responder or not. Such scores and/or scoring criteria may be preset or otherwise predefined and stored within system 1000.

For example, suppose the following scores are associated with the following times within which assistance must be rendered (e.g., for Factor1):

TABLE 1.0

| Time ranges | Score |
|---|---|
| 0 min ≤ t ≤ 5 min | 5 |
| 5 min < t ≤ 10 min | 4 |
| 10 min < t ≤ 20 min | 3 |
| 20 min < t ≤ 30 min | 2 |
| 30 min < t ≤ 60 min | 1 |
| 60 min < t | 0 |

Further suppose that the following messages (column B of Table 1.1) are received at particular time (column D of Table 1.1) from three target terminals (TU) (column A of Table 1.1), and the following scores (column F) are determined for each based on, in this example, information gathered from the message itself (e.g., "AT" in column C of Table 1.1), the time the message was received ("TR" in column D of Table 1.1), and the present time (CT in Table 1.1). In this particular example, the scoring expression may be given by (RT+t)−CT, and the score may be determined by a comparison of the result of the scoring expression with Table 1.0 above.

TABLE 1.1

| | | Current Time (CT) = 12:00 PM | | | |
|---|---|---|---|---|---|
| A | B Message | C Estimated time within which assistance is to be rendered (AT) | D Time TBM was received (TR) | E (TR + 1) − CT | F Factor1 Score |
| TU 1 | "A child in my vicinity is unconscious and needs help immediately" | 1 minute or less | 12:00 PM | (12:00 PM + 0:01) − 12:00 PM = 0:01 1 minute | 5 |
| TU 2 | "I am trapped alone in a room where the rubble from the earthquake has blocked the door; but I am safe and could wait for up to 2 hours for assistance if others need help first" | 2 hours | 12:02 PM | (12:02 PM + 2:00) − 12:00 PM = 2:02 122 minutes | 0 |
| TU 3 | "I sustained an injury and am bleeding pretty badly, I need assistance within the next 20 minutes. | 20 minutes | 11:58 AM | (11:58 AM + 0:20) − 12:00 PM = 0:18 18 minutes | 3 |

Extending the example above, suppose the following scores are based on whether there are children in the vicinity of a responder or not (e.g., Factor2):

TABLE 2.0

| Children in the vicinity of messaging Target terminal | Factor2 Score |
|---|---|
| Yes | 2 |
| Unknown | 1 |
| No | 0 |

And further suppose, just as above with regard to Table 1.1, that the following messages (repeated in column B of Table 2.1) are received at particular time (repeated in column D of Table 2.1) from three target terminals (TU) (repeated in column A of Table 1.1), and the following scores for Factor2) (column F) are determined for each based on, in this example, information gathered from the message itself concerning children in the vicinity of the TUs. In this particular example, the scores may be determined by a comparison of a message analysis with Table 2.0 above.

TABLE 2.1

Current Time (CT) = 12:00 PM

| A | B<br>Message | C<br>Estimate of whether any children are within the vicinity | D<br>Time TBM was received (TR) | E<br>Factor 2 Score |
|---|---|---|---|---|
| TU 1 | "A child in my vicinity is unconscious and needs help immediately" | Yes | 12:00 PM | 2 |
| TU 2 | "I am trapped alone in a room where the rubble from the earthquake has blocked the door; but I am safe and could wait for up to 2 hours for assistance if others need help first" | No | 12:02 PM | 0 |
| TU 3 | "I sustained an injury and am bleeding pretty badly, I need assistance within the next 20 minutes. | Unknown | 11:58 AM | 1 |

System 1000 may apply the scoring expression given in Eqn. 1 above, for example, and determine the priority scores accordingly. A summary of such priority scores in the illustrative example above are shown in Table 3.0 below:

TABLE 3.0

Current Time (CT) = 12:00 PM

| A | B<br>Message | C<br>Factor1 Score | D<br>Factor2 Score | E<br>PRIORITY SCORE |
|---|---|---|---|---|
| TU 1 | "A child in my vicinity is unconscious and needs help immediately" | 5 | 2 | 7 |
| TU 2 | "I am trapped alone in a room where the rubble from the earthquake has blocked the door; but I am safe and could wait for up to 2 hours for assistance if others need help first" | 0 | 0 | 0 |
| TU 3 | "I sustained an injury and am bleeding pretty badly, I need assistance within the next 20 minutes. | 3 | 1 | 4 |

Based on the priority scores computed by system 1000 and shown above in Table 3.0, system 1000 may determine that, as between the three target terminals in the above example, TU 1 is the first priority (with the highest priority score), TU 3 is the second priority (with the second highest priority score), and TU 2 is the third priority (with the lowest priority score). System 1000 may allocate assignments for emergency responders to be dispatched to the aid of the target terminals in accordance with the priority determined among the plurality of units under consideration for a given application.

Mission assignment component 1716 matches candidate emergency responders with targets in need of assistance, and may issue a notification or other message to the emergency responder through an emergency responder terminal 1200, and/or to the target through a target terminal 1200. Mission assignment component 1716 may determine which one or more emergency responders should be dispatched to assist one or more targets in need of assistance, and such determination may be determined on any one or more of: a location of a candidate emergency responder terminal 1100, a location of a target terminal 1200 in need of assistance, a location of a piece of equipment, a priority among a plurality of targets, one or more pieces of information stored in a user profile for one or more registered users (either or both of emergency responders or targets associated with emergency responder terminals 1100 and target terminals 200), or any information derived from the foregoing (e.g., absolute distance or route distance between a given emergency responder terminal and a given target terminal). Mission assignment component 1716 may, in accordance with one or more embodiments, further receive feedback from a registered user (e.g., an emergency responder, a target, etc.) indicating the need for additional assistance for a particular assignment, or the need for a reassignment for one reason or another. System 1000 may automatically make an additional assignment (e.g., summon another emergency responder), make a new assignment, or modify an assignment based on the feedback and further based on other information available to it. The other information available to System 1000 and which may be used for determining an additional assignment, new assignment, or modification to an assignment may include: (i) nearby emergency responders available to assist, (ii) nearby emergency responders with a given skillset or with a given capability, (iii) nearby target users able to assist, etc. An example implementation is discussed with reference to selectable icon 1953 and selectable icon 1954 of FIG. 3C.

Mission route component 1718 may determine one or more routes providing possible paths of travel that an emergency responder may follow in order to reach the target terminal 1200. Mission route component 1718 may draw upon map information stored within system 1000 (e.g., within electronic storage 1730) or otherwise accessible to system 1000 (e.g., via a map database accessible online) to determine and/or provide a route upon which the responder may travel to reach the target terminal 1200. Such map information may be based on building information (e.g., stairwell locations, elevator bays, escalators), online map information (e.g., google maps information). The route provided may be a walking route, driving route, bicycle route, or any route suitable for any mode of travel (escalator route, elevator route, etc.) or any combination of the foregoing. The determined route or routes may be displayed as an overlay on a portion of a real-world scene captured by a camera component 1706 of an emergency responder terminal, or may be provided as a list of visual instructions, a list of audio instructions, or in any other format or manner desired. In some embodiments, multiple routes are determined and provided to an emergency responder via the emergency responder's emergency responder terminal 1200.

Referring back now to display object component 1708, in some embodiments a display object component 1708 may define one or more display objects representing a route of travel depicting a virtual path between the location of an emergency responder terminal 1100 and the location of a target terminal 1200, location data for which having been obtained and/or stored by system resources 1800, and the route determined by mission route component 1718. A display object may include any graphic (e.g., a broken or solid line, arrow, etc.) that may be displayed on an electronic display of the emergency responder terminal.

Display object component 1708 may dynamically refresh and/or adapt display object definitions such that the display objects displayed on display of respective units update to reflect recent information (e.g., location or orientation of respective units). For example, display object component 1708 may adjust the position of display objects representing a route responsive to a determination that a portion of a real-world scene captured by a camera component 1706 of an emergency responder terminal 1100 has changed; the changed portion capturing a different region of the real-world scene than was previously captured, such that the region of space where the target terminal 1200 location is represented on the display changes.

Equipment location component 1722, in accordance with one or more embodiments of the present disclosure obtains equipment location data of one or more units of equipment in the vicinity of the emergency (the vicinity defined as desired for a given implementation). In some embodiments, such equipment location data may be obtained via location resources (e.g., location circuitry) local to or coupled with pieces of such equipment, and may be provided to system 1000 over network 1600 (which in some instances may be include mesh network options). Equipment location data may be indicative of the geospatial location of one or more pieces of equipment in the vicinity of the emergency.

In accordance with one or more embodiments of the present disclosure, system 1000 may obtain location data by actively transmitting a location data request to one or more location resources coupled with or near pieces of equipment, thereby prompting the one or more location resources (e.g., GPS modules, altimeter, barometer, beacons, RFID tags, etc.) to obtain location information and cause a data packet containing the location data (e.g., location details) to be generated and/or transmitted to a computing resource of system 1000. For instance, EME 1300 of system 1000 may receive a responsive transmission from the one or more pieces of equipment (i.e., from a communication interface coupled with a piece of equipment) containing the one or more pieces of equipment's respective equipment location data, and system 1000 may propagate and/or store such information within an electronic storage or memory of system 1000 as desired for a particular application or by a particular resource coupled to or within system 1000.

Equipment location data may indicate geospatial location of a piece of equipment in the vicinity of the emergency, including longitude and latitude coordinates, degrees/minutes/seconds location parameters, altitude above sea level, altitude above ground level, etc. Equipment location component 1722 may be utilized to identify geospatial location of a piece of equipment. Equipment location component 1722 may comprise one or more circuits, modules, or chips local to the units themselves. For example, equipment location component 1722 may include a GPS sensor, an altimeter, a pressure sensor (e.g., a barometer), beacon (e.g., Bluetooth beacon), RFID tag, and the like. In some embodiments, equipment location component 1722 may further comprise hardware and software operating on EME 1300 and communicatively coupled with location sensors of one or more units.

Figure 3A:
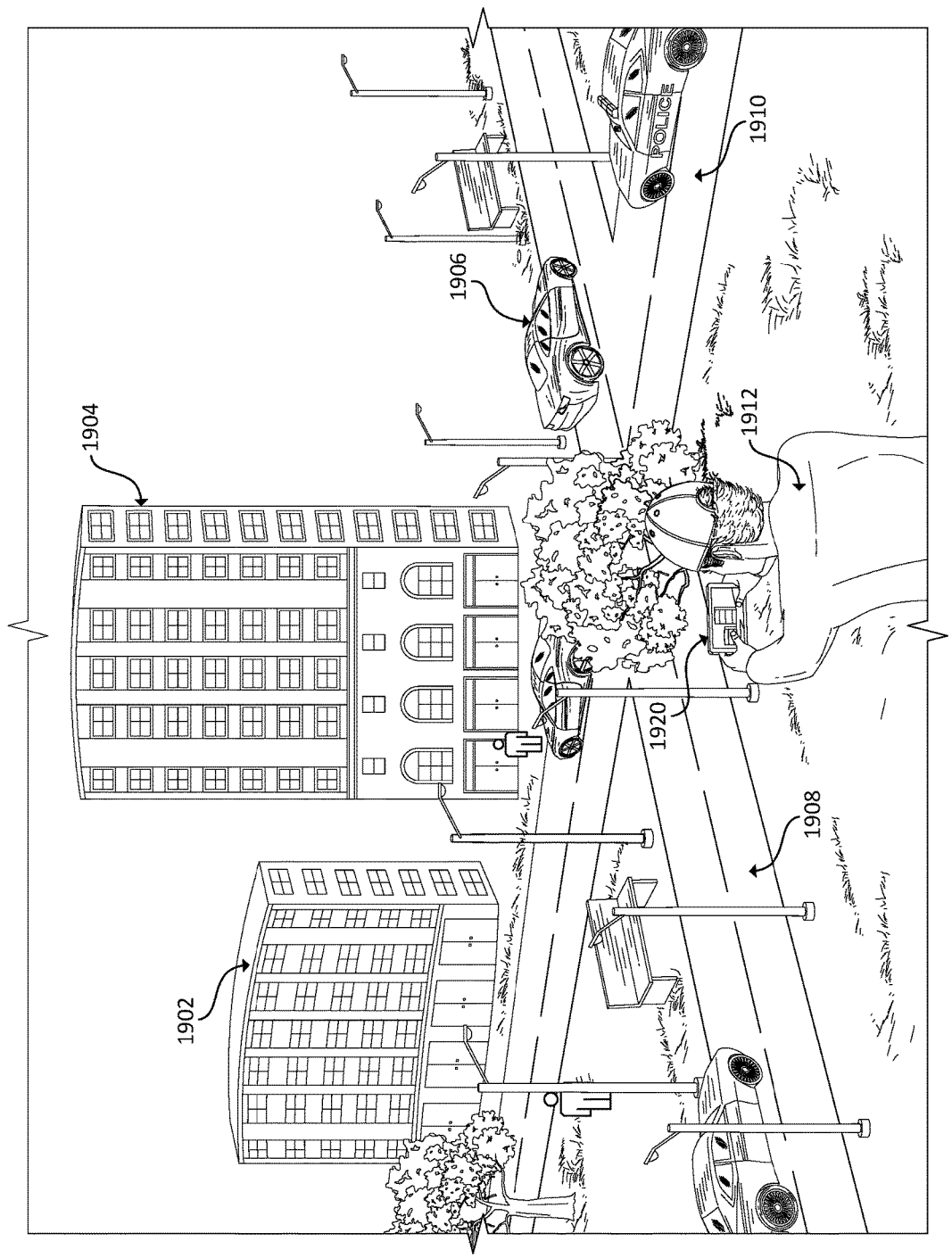
FIG. 3A depicts an example emergency responder utilizing the presently disclosed technology in an example environment in which the presently disclosed technology may be implemented.

FIG. 3A depicts an example emergency responder 1912 utilizing the presently disclosed technology in an example environment in which the presently disclosed technology may be implemented. As shown, emergency responder 1912 is holding up his emergency responder terminal 1920 to capture a portion of the real-world scene he is within (the camera component of emergency responder terminal 1920 being pointed in the direction of the portion of the real-world scene the emergency responder desires to capture). Here, the portion of the real-world scene may be a city block intersection that includes, for example, buildings 1902, 1904, automobiles 1906, 1907, city streets 1908, 1910, city benches 1914, street lighting, plant life, pedestrians (which may or may not be other registered users), etc.

Figure 3B:
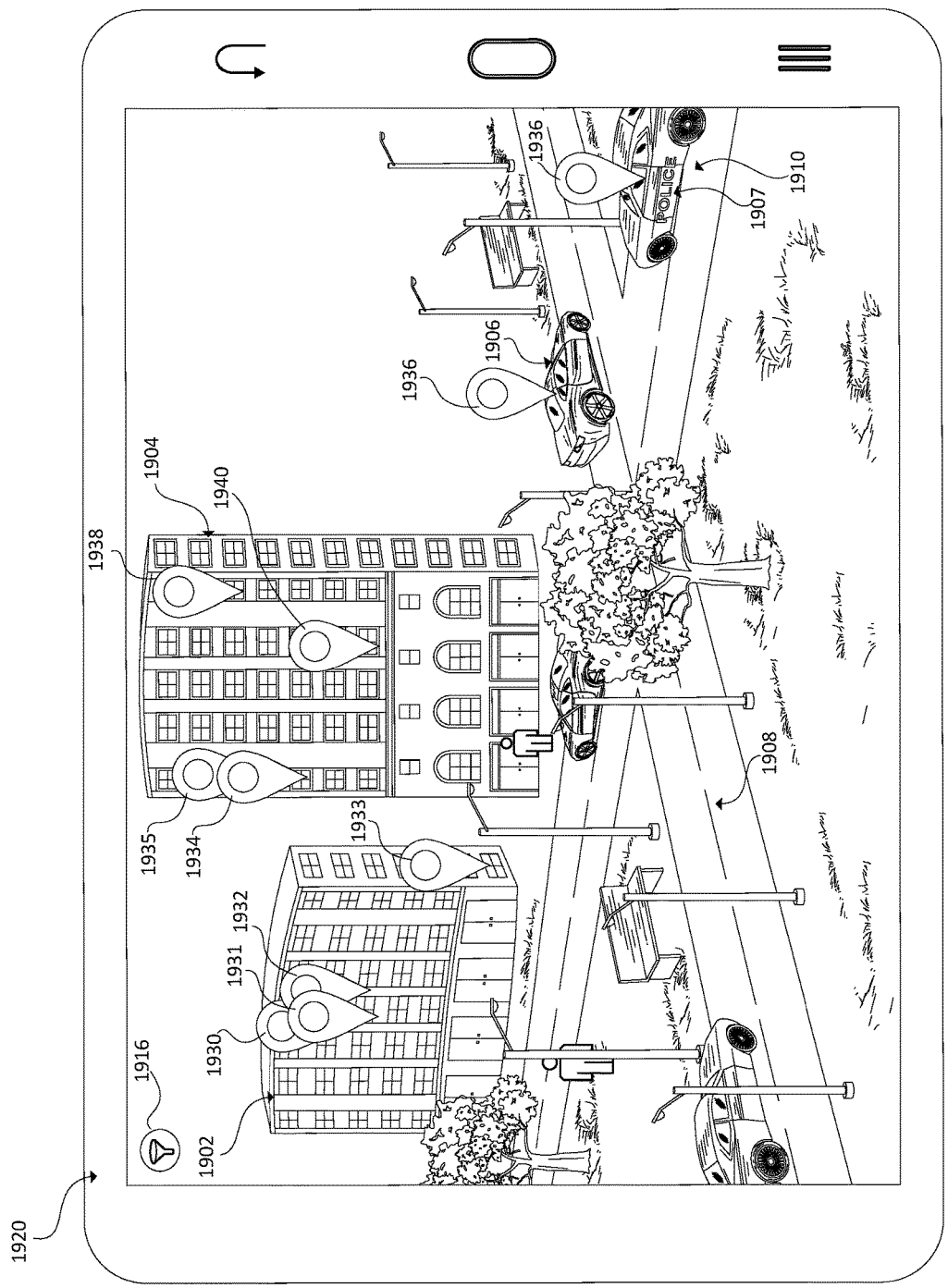
FIG. 3B illustrates an example augmented reality presentation that may be displayed on the emergency responder terminal of the emergency responder shown in FIG. 3A, here showing various user locations in accordance with one or more embodiments of the present disclosure.

FIG. 3B illustrates an example augmented reality presentation that may be displayed on the emergency responder 1912's emergency responder terminal 1920 of FIG. 3A. As shown, the presentation may include one or more augmented reality display objects corresponding to registered user locations (e.g., target location display objects 1930, 1931, 1932, 1934, 1935, 1936, 1940; emergency responder location display object 1937) in accordance with one or more embodiments of the present disclosure. That is, display objects 1930-1940 are provided as an augmented reality overlay to indicate where in the real-world scene other registered users within the scene being captured are located. Because user location component 1704 of system 1000 may determine users' altitude as well as longitudinal and latitudinal coordinates, display objects 1930-1940 may be positioned to reflect both horizontal and vertical displacement as between the emergency responder terminal 1920 and the other terminals within the real-world scene being captured. In some embodiments, the display objects may show horizontal distance, vertical distance, or other information as part of the display object itself (shown in FIG. 4). In some embodiments, a visual feature (e.g., size, color, shape, etc.) of a display object may be used to convey relative distance information about user locations relative to the given emergency responder's location. For example, although not shown in FIGS. 3A-3G for simplicity, display objects associated with user terminals whose location is further from the emergency responder's terminal than others may appear to be smaller; and likewise display objects associated with user terminals whose location is closer to the emergency responder terminal than others may appear to be bigger. Thus, in some embodiments the size (or other visual feature) of a display object being displayed on an emergency responder's terminal may be displayed having a size that is a function of the distance between the terminal associated with the display object and the emergency responder's terminal (shown in FIG. 4). In some embodiments, display objects may be selectable to drill down into other information about the user (e.g., location details, registered user data), and/or options associated with the given user, as illustrated in FIG. 3C.

Figure 3C:
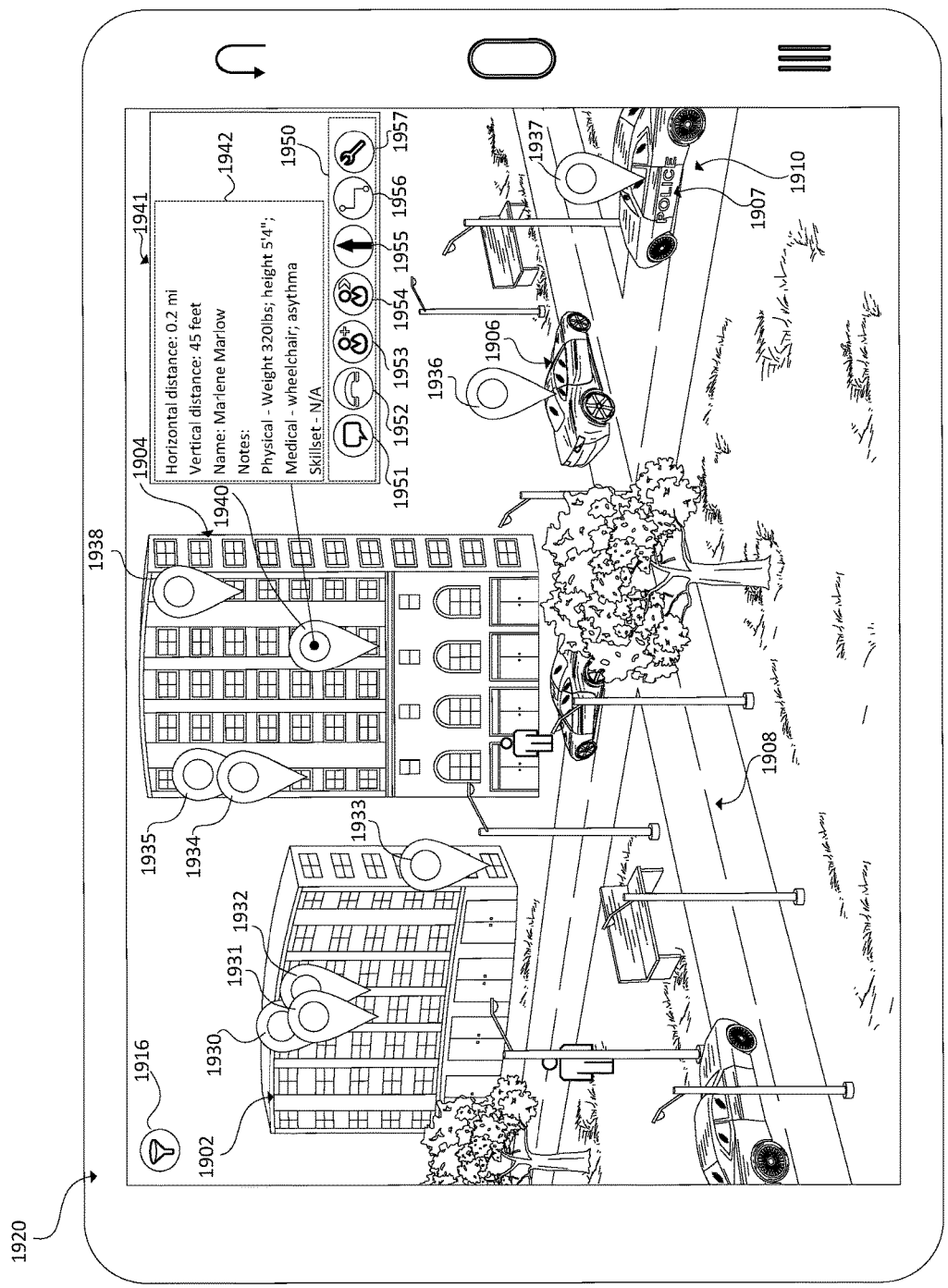
FIG. 3C illustrates an example augmented reality presentation that may be displayed on the emergency responder terminal of the emergency responder shown in FIG. 3A, here showing example registered user data and related options associated with one of the target users in accordance with one or more embodiments of the present disclosure.

FIG. 3C illustrates example registered user information 1942 and example related options 1950 displayed in an augmented reality presentation similar to that shown in FIG. 3B. The registered user information 1942 and related options 1950 are associated with the user that corresponds to display object 1940 in the presentation. As shown in this example, such registered user information 1942 and related options 1950 may be may be presented in an example pop-up field 1941. In some embodiments, registered user information 1942 and/or related options 1950 may appear in such an example pop-up field 1941 upon user selection, for example, such as the emergency responder 1912 tapping the display object 1940 on the touchscreen display of their emergency responder terminal 1920 to reveal the additional information and options. In some embodiments, registered user information 1942 and/or related options 1950 may appear in such an example pop-up field 1941 upon a mission assignment from an emergency supervisor, for example, such as an emergency supervisor overseeing a team of emergency responders making a selection that issues a command that assigns emergency responder 1912 to be dispatched to aid the registered user associated with display object 1940. Upon the assignment being made, the additional registered user information and other options may be automatically presented. In such embodiments, a supervisor or other manager of a team of emergency responders can quickly and efficiently match and dispatch certain of their emergency responders to go render assistance to certain of the registered users in need of assistance (i.e., targets).

As shown, example registered user information provided in pop-up field 1941 may include the horizontal distance and/or vertical distance from one or more other points in space. In FIG. 3C, as may be seen, there is a horizontal distance of approximately 0.2 miles between the emergency responder 1912's terminal and the target terminal associated with the display object 1940. There is a vertical distance of approximately 45 feet between the emergency responder 1912's terminal and the target terminal associated with the display object 1940.

In some embodiments, the distances presented to the user may reflect different measures. For instance, the point in space from which to compute the vertical distance might be ground level, sea level, the height/altitude of the emergency responder (or other registered user), or any other point as desired for the given application; and the point in space from which to measure the horizontal distance might be the latitudinal and longitudinal coordinates of the emergency responder (or other registered user), or any other point as desired for the given location. In some embodiments, one or more of the distances provided represent the shortest horizontal and shortest vertical distances between the point in space and the location of the registered user in space (e.g., a straight horizontal line between the emergency responder 1912's location and the target's location (represented by display object 1940). In some embodiments, one or more of the distances provided may represent the horizontal and/or vertical distance that would need to be traversed to follow a recommended route between the two points (such a route is shown and discussed in more detail with respect to FIG. 3D). In some embodiments, a distance measure provided may be a line-of-sight distance (that is, the length of the hypotenuse that is opposite the right angle formed between a straight line representing the shortest horizontal distance and straight line representing the shortest vertical distance line).

In some embodiments, the system may provide a route distance if route information can be obtained (e.g., via a maps application, based on building structure information, etc.), and alternatively a shortest horizontal and/or shortest vertical distance and/or a line-of-sight distance if no route information can be obtained (or the route information is inadequate or unselected). One of ordinary skill in the art will appreciate that any one or more units of distance measure (e.g., feet, meters, inches, yards, miles, kilometers, etc.) may be used in connection with the present disclosure.

As further shown in pop-up field 1941, registered user information may include, by way of example and not by way of limitation, the user's name, physical characteristics, medical or health conditions, skillsets, or any other information obtained by or accessible to system 1000. This information may be helpful for an emergency responder (or the emergency responder's supervisor) to better understand how to help the person in need, and/or to more appropriately dispatch emergency responders to the aid of a given person. For example, the registered user associated with display object 1940 in FIG. 3C, named Marlene Marlow, is registered as being 5'4" tall and 320 pounds, and has medical conditions including asthma and a condition that constrains her to a wheelchair. Thus, the emergency responder 1912 may take extra steps to prepare to help Marlene.

These extra steps may include, by way of example and not by way of limitation, texting or calling Marlene to establish contact and/or to determine if Marlene's wheelchair is operable and/or if she has knowledge of an accessible wheelchair ramp in the building, for example (e.g., by pressing icon 1951 for texting, or by pressing icon 1952 for voice or video calling, etc.). These extra steps may include summoning another emergency responder for additional help, for example, if the emergency responder 1912 recognizes that more than one person will be required to lift Marlene out of the building (e.g., by pressing icon 1953 to summon another nearby emergency responder, or other registered user with a skillset that could be employed to assist Marlene). These extra steps may include transmitting a request to re-assign the mission to assist Marlene to another emergency responder with a different skillset (assuming the emergency responder was assigned the mission in the first place). For instance, emergency responder 1912 may not have any equipment (such as an inhaler) to help a person having an asthma attack (assuming this were the case), and may press icon 1954 to request a re-assignment of the mission to another emergency responder that does have such equipment. Such requests may be pre-programmed and/or selectable from a menu, or may be customized messages sent through in-app messaging or SMS messaging between emergency responders. In some embodiments, certain registered user information and/or options may be displayed as part of the original display object itself such that the user need not select anything to see such certain registered user information about a particular user. Such certain information may include any information desired that is accessible to or stored by system 1000.

Figure 3D:
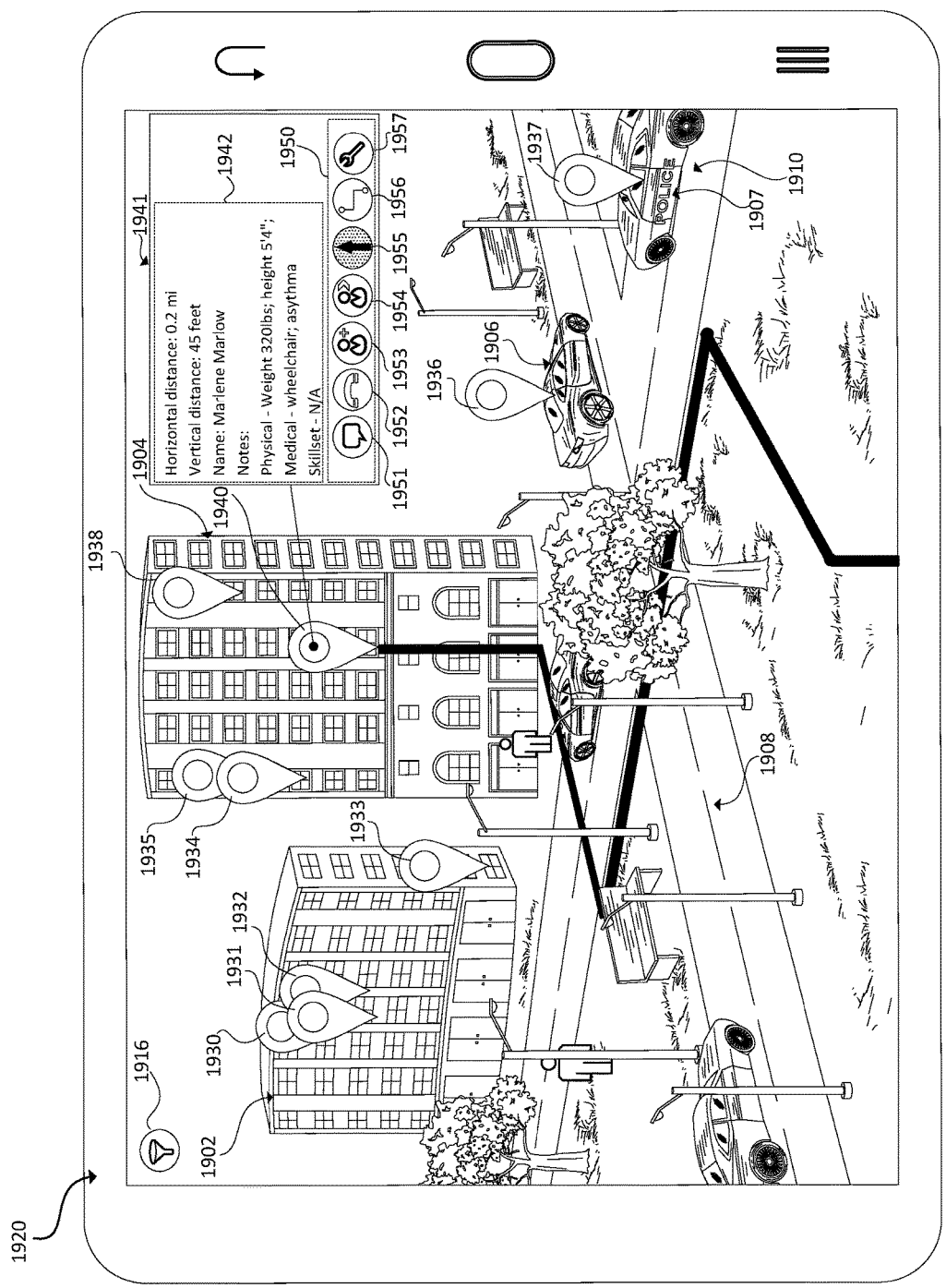
FIG. 3D illustrates an example augmented reality presentation that may be displayed on the emergency responder terminal of the emergency responder shown in FIG. 3A, here showing example route information associated with one of the users in accordance with one or more embodiments of the present disclosure.

In some embodiments, an emergency responder 1912 may be provided with route information providing a route path to arrive at the location of the target. Such route information may be in the form of a list of directions, or a graphic representation of the route path. For example, the emergency responder 1912 in the present example may press button 1955 to show a graphical representation of a route path between the emergency responder and the target as shown in FIG. 3D. As shown in FIG. 3D, the route path 1965 may be displayed in the presentation to show the path the emergency responder may follow to arrive at the location of the target. FIG. 3D shows icon 1955 shaded to reflect that it has been selected. The route path may dynamically adjust as the location of either the emergency responder or the location of the target changes (based on the location of their respective terminals). The route path may dynamically adjust to reflect new information obtained by system 1000 about possible routes. For example, system 1000 may receive an indication from a first emergency responder that a particular stairwell is blocked by an active fire, so the only other route is to access the upper floors is by the fire-escape ladder on the east side of the building. Accordingly, system 1000 may route or re-route and display a new route path that reflects the updated information and informs the emergency responder that they must proceed to a different entry point than might otherwise be expected.

Although not shown in the augmented reality presentation of FIG. 3D, other information related to the route may be displayed in connection with the route path, such as, for example, an estimated time of arrival (based on average walking/running speeds, based on the particular emergency responder's walking/running speeds), an estimated time within which an emergency responder must arrive (e.g., help NEEDED within 5 minutes) before the situation becomes critical/fatal. The route information may further include mission recommendations such as, run 0.2 miles along path to building, walk to east side of building, climb ladder, break the seventh window you arrive at while climbing the ladder, proceed into the building with caution, press icon to activate an alarm on the target's terminal, proceed to sound, and so on. Such mission recommendations may be based on one or more of (i) the time within which an emergency responder must arrive to render adequate care, (ii) the given emergency responder's location relative to the target's location, (iii) the route path, (iv) the emergency responder's physical capabilities (based on historical trends, inputs from the emergency responder, etc.), (v) the tools the emergency responder has with them, (vi) the building structure as known to system 1000, (vii) feedback from other emergency responders providing updates about the building, compromised routes of travel, or feedback about the emergency situation generally.

Figure 3E:
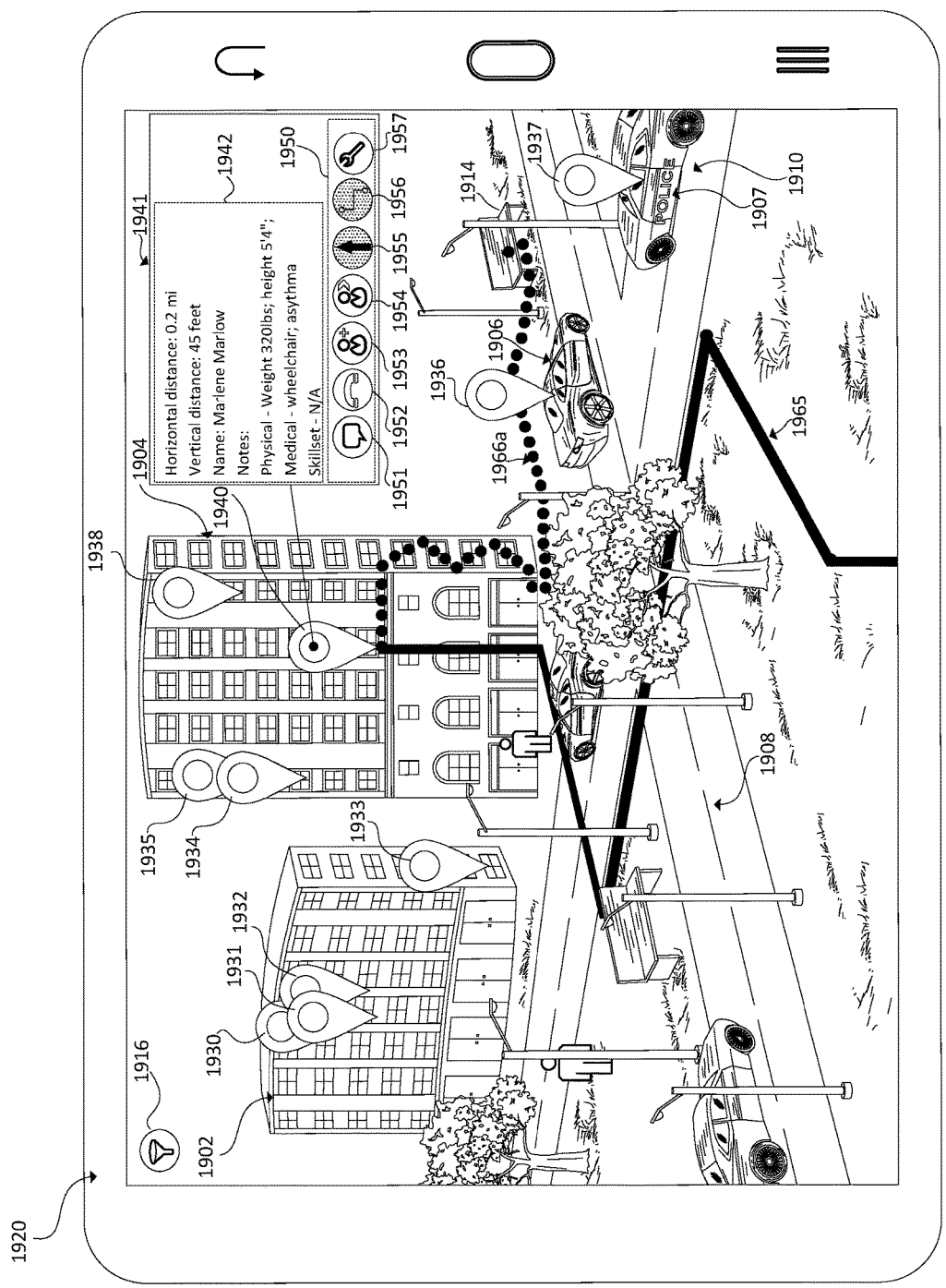
FIG. 3E illustrates an example augmented reality presentation that may be displayed on the emergency responder terminal of the emergency responder shown in FIG. 3A, here showing example user path information associated with the given user in addition to the route information shown in FIG. 3D, in accordance with one or more embodiments of the present disclosure.

In some embodiments, an emergency responder 1912 may be provided with user path (e.g., target path) information providing a user path, or a portion of a user path, that led them to their current location. Such information may be useful to identify how a particular user arrived at their current location, such information further being useful to identify a possible path to follow to get to the target location, to identify users that may have caused or seen what caused some action that gave rise to the emergency situation, among other information. Such user path information be shown as a graphic delineating a path. For example, after pressing display object 1940, emergency responder 1912 may press button 1956 to show a graphical representation of the user path 1966*a* for the target user associated with the display object 1940. As shown, user path 1966*a* in the example provided in FIG. 3E is shown by a series of black dots that convey the user's path. Although not shown in FIG. 3E, some graphical representations of a user path may indicate the direction of the user's travel. For instance, considering FIG. 3E, if the user associated with display object 1940 traveled from the bench 1914 to the second floor of building 1904, the dots between the bench 1914 and the building 1904 may include an arrow or other pointer pointing substantially in a leftward direction. As shown in FIG. 3E, the user path 1966 may be displayed in the presentation to show the path a given target travelled to arrive at their current location. FIG. 3E shows icon 1956 shaded to reflect that it has been selected.

Figure 3F:
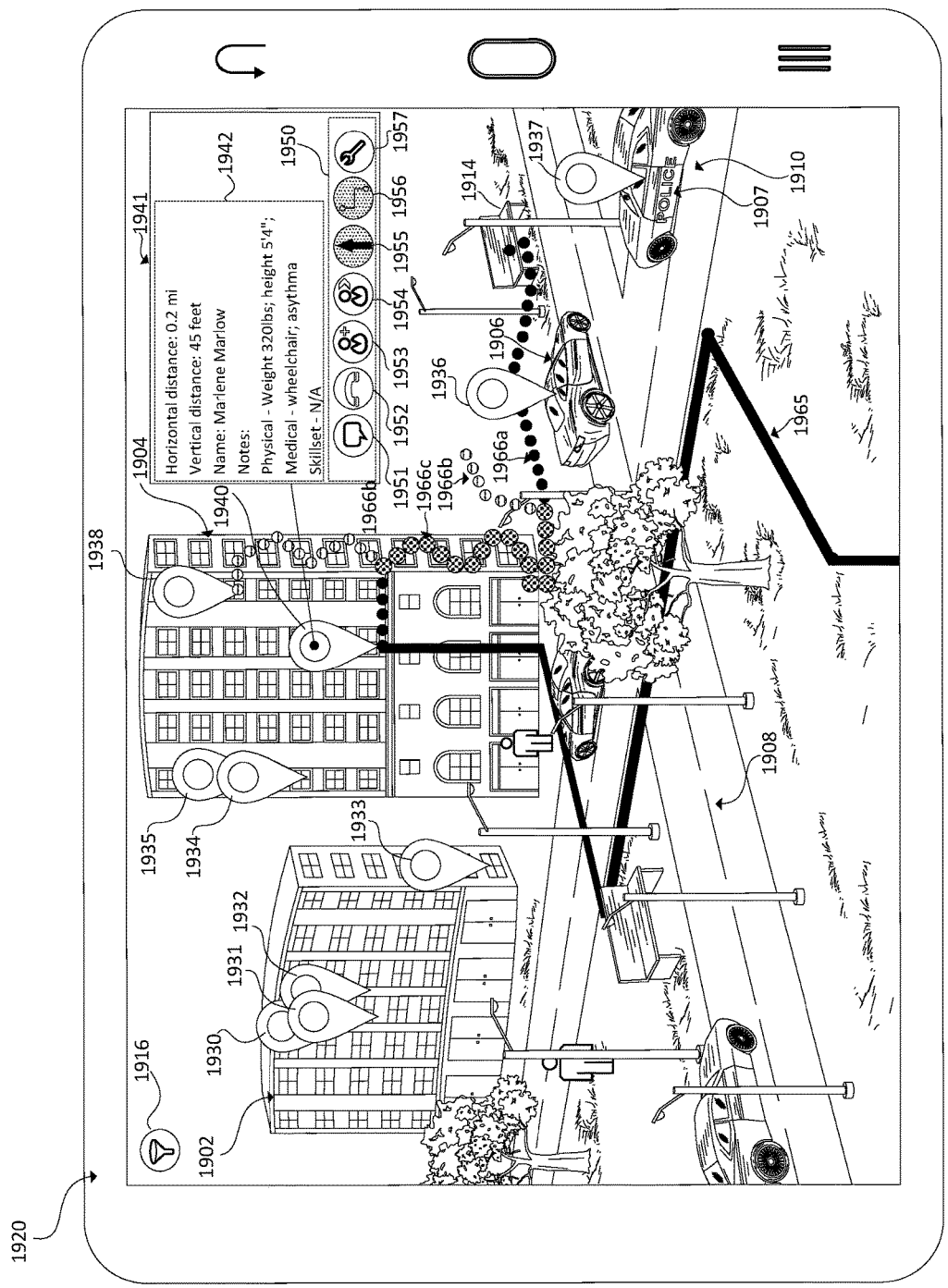
FIG. 3F illustrates an example augmented reality presentation that may be displayed on the emergency responder terminal of the emergency responder shown in FIG. 3A, here showing example user path information associated with multiple users in addition to the route information shown in FIG. 3D, in accordance with one or more embodiments of the present disclosure.

In some embodiments, as shown by way of example in FIG. 3F, multiple user paths for multiple users may be displayed in the same presentation. For instance, in addition to user path 1966*a* (denoted by black dots), the presentation may further show user path 1966*b* (denoted by dots having a horizontal line pattern) that shows the path that the user associated with display object 1938 followed to arrive at their current location. In some such embodiments, one or more user paths may partially or entirely overlap. In some such embodiments, the graphical representation provided for the overlapping portion of multiple users' paths may be adjusted to exhibit a visual feature denoting an increased density of individuals traveling along the same path (e.g., to denote a heavily traveled path). For example, instead of showing multiple lines of dots on top of one another or immediately next to one another, a single line of dots may be shown as larger dots in areas of overlap. That is, the size of the graphical representation used to denote user paths may be adjusted to reflect increased or decrease traffic along such paths, or portions of such paths. In some instances, the areas of overlap are distinguished by visual features other than, or in addition to, size. For instance, as shown in FIG. 3F, the portion of the user paths that overlap is denoted with dots having a checker pattern fill rather than a solid fill (as user path 1966*a*) or a horizontal line pattern fill (as user path 1966*b*).

As one of ordinary skill in the art will appreciate upon review of the instant disclosure, any graphical representation desired may be use to delineate a user path or a route path. The dots and lines used in FIGS. 3D-3G are in no way intended to be limiting, but instead are merely used as illustrative aids to help describe example implementations of the technology presented in the instant disclosure.

Figure 3G:
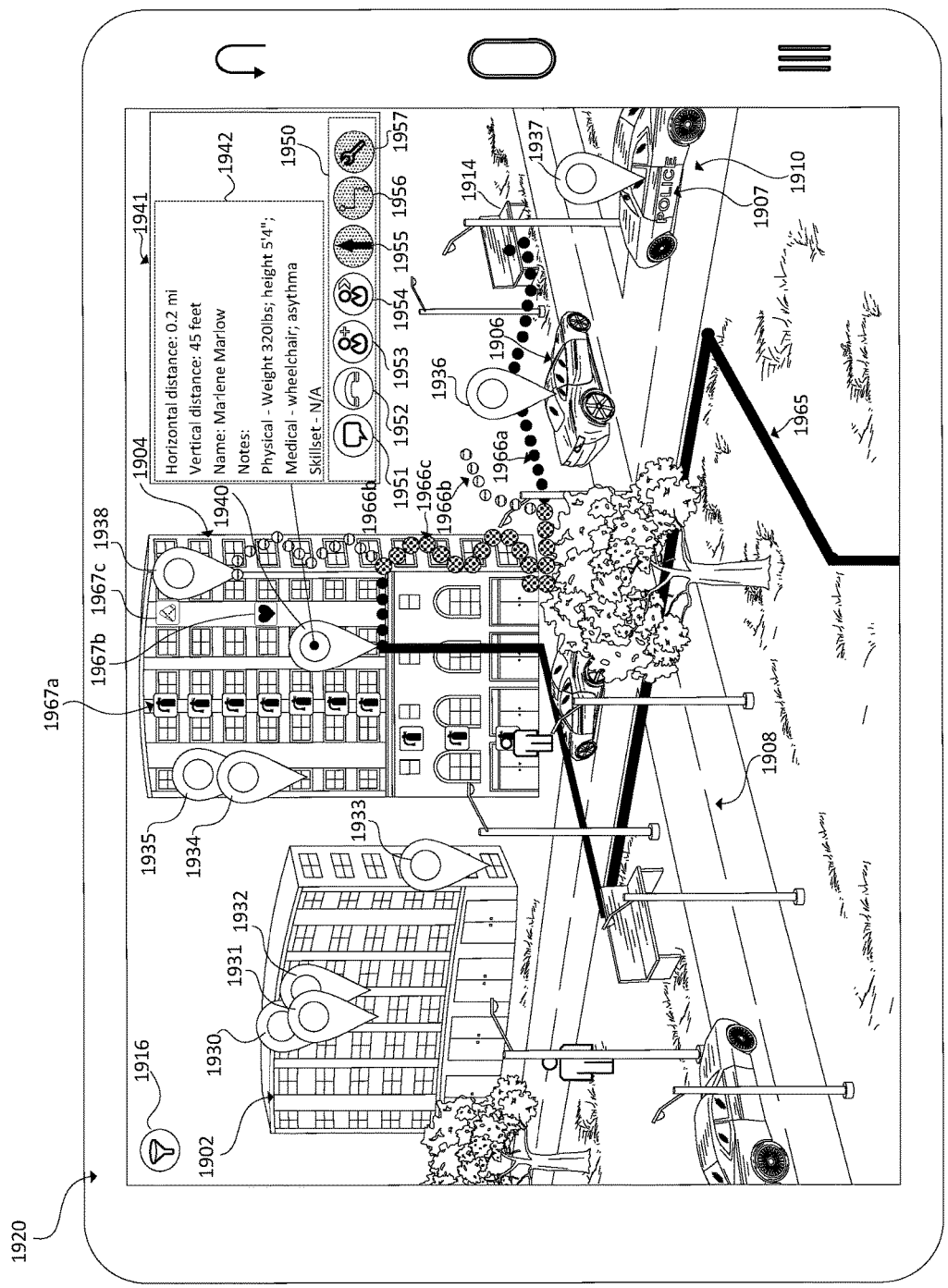
FIG. 3G illustrates an example augmented reality presentation that may be displayed on the emergency responder terminal of the emergency responder shown in FIG. 3A, here showing example equipment locations in addition to the information shown in FIG. 3F, in accordance with one or more embodiments of the present disclosure.

FIG. 3G illustrates the example augmented reality presentation shown in FIG. 3E, here further showing example equipment locations in accordance with one or more embodiments of the present disclosure. As noted, in some embodiments, system 1000 may obtain location information of one or more pieces of equipment within (or associated with) the zone of interest, and may further provide such location information of one or more pieces of equipment to the one or more emergency responder terminals and/or present augmented reality display objects on the display of such emergency responder terminals (similar to the augmented reality display objects discussed above with respect to registered users and target terminals). Such equipment may include a fire extinguisher, an epinephrine pen (EpiPen), an axe, an oxygen mask, a defibrillator, a hose, a mask (e.g., an oxygen mask, an antimicrobial mask), a fire alarm, a fire hydrant, a hose, a rope, etc. For example, as shown in the example illustration in FIG. 3F, display objects (represented collectively by numeral 1967*a*) corresponding to fire extinguishers are presented as augmented reality overlays atop the presented image in locations where one or more pieces of equipment exist within the real-world scene being presented. In another example, as shown, display object 1967*b* corresponding to a defibrillator is presented as augmented reality overlays atop the presented image in a location where such defibrillator exists within the real-world scene being presented. In another example, as shown, display object 1967*c* corresponding to a package of antimicrobial masks is presented as an augmented reality overlay atop the presented image in a location where such package of antimicrobial masks exists within the real-world scene being presented (here, on the top floor of building 1904). One of ordinary skill in the art will appreciate that any display object desired may be presented to correspond to a location of any piece of equipment relevant to a particular emergency situation. Different buildings may have different equipment. Thus, in different implementations of system 1000, different icons may be associated with such equipment and presented as augmented reality overlays as a user (e.g., emergency responder 1912) views a portion of a scene as captured via the camera component of their terminal. In some embodiments, equipment locations may appear within the augmented reality presentation upon user selection, for example, a user's selection of equipment icon 1957 shown in related options field 1950.

It should be noted here that the various features discussed herein with reference to Emergency App features available in connection with target terminals and associated users may also be implemented, in some embodiments, in connection with emergency vicinity components and associated units of equipment. The components discussed above (or additional analogous components) may be further configured to extend their features to units of equipment just as they do to users.

For example, display object component 1708 (or similar component) may be configured to define display objects associated with units of equipment whose location data has been obtained by system 1000 via one or more system resources 1700. Such display objects may include any graphic (e.g., a pin, a bubble, a tile, an icon, or the like) that may be displayed on an electronic display of a terminal. A display object component such as display object component 1708 may determine when a portion of a real-world scene captured by a camera component 1706 of an emergency responder terminal 1100 captures a region of space wherein a unit of equipment, a target terminal 1200, and/or other emergency responder terminals 1100 are located. As one or more portions of the real-world scene captured is provided on the display of the emergency responder terminal 1100 (e.g., as a user scans the camera over a scene), such display object component may cause the display objects corresponding to units of equipment (additionally with or alternatively to the display objects corresponding to target terminals 1200 and/or other emergency responder terminals 1100) falling within the scene to be displayed such that they overlay the real-world scene images in a manner (e.g., on a region of the image) that identifies the location of respective units of equipment within the real-world scene as it is displayed on the display of the given emergency responder terminal 1100.

In another example, registered user detail component 1710 (or similar component such as an Other Component 1742 called an Equipment detail component, for example) may be configured to: obtain and/or store information about a unit of equipment. Such a component may obtain such information either via manual input from a user into an equipment profile that may be stored in electronic storage 1730, or by polling for such information from a communications resource of an emergency vicinity component coupled to the unit of equipment and in operative communication with system 1000, for example. Such information may include equipment details such as a name or type of the unit of equipment (e.g., defibrillator, EpiPen), a quantity of units of equipment being referenced (e.g., 25 oxygen masks available), a status of the unit(s) of equipment being referenced (e.g., Hose is currently inoperable, EpiPen already discharged, only 30% battery remaining in defibrillator, 2 hours of flashlight life left, etc.), an instruction or link leading to an instruction regarding how to use the equipment, a warning or caution regarding the equipment (e.g., "For use only by medical professionals," "do not touch the red button on the back side of the unit," etc.), or any other details about the equipment as may be desired. Any and all such equipment detail information may be stored in any electronic storage available to system 1000, such as in an equipment data 1736 sector of electronic storage 1730.

Figure 4:
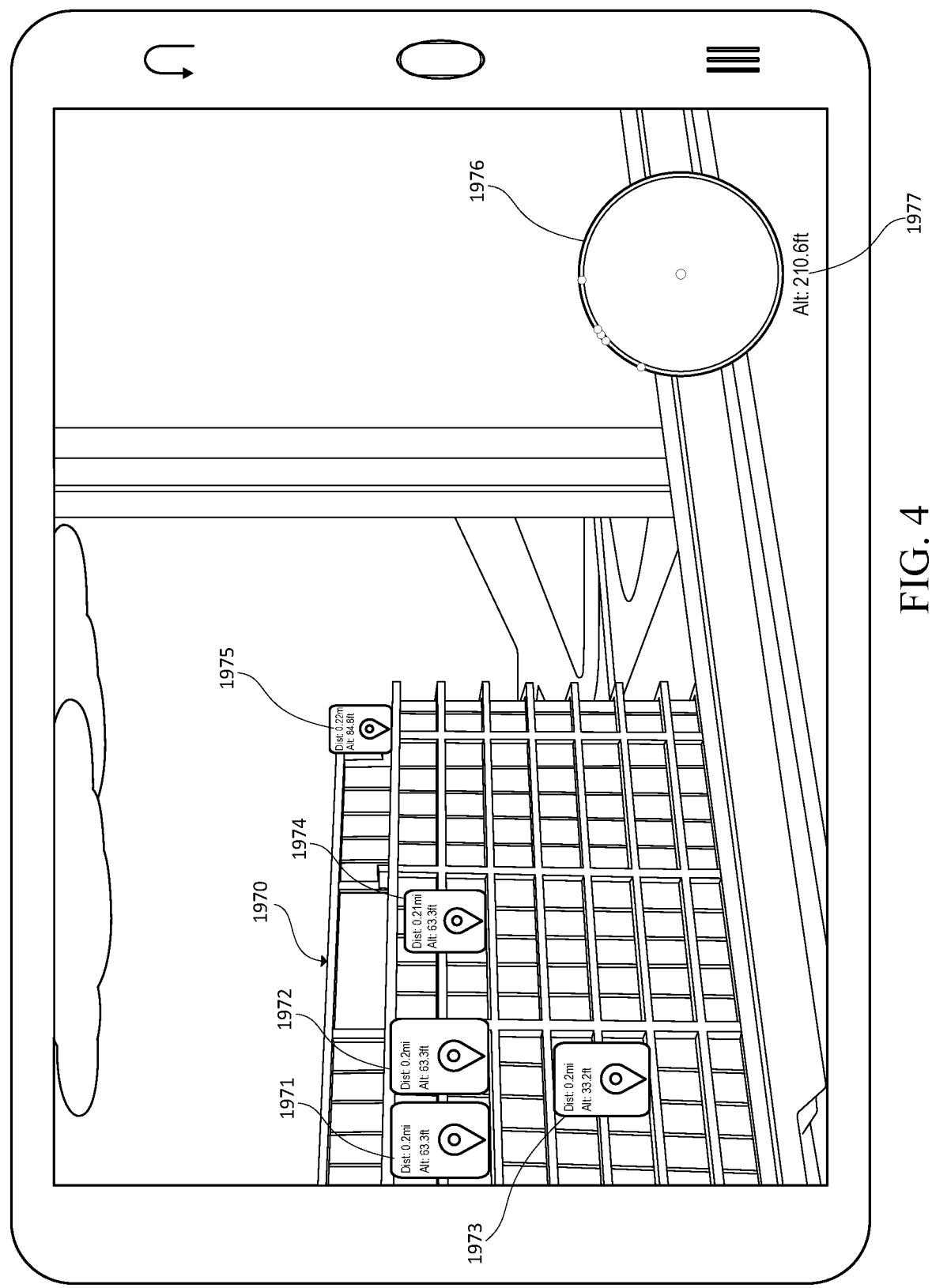
FIG. 4 illustrates another example augmented reality presentation that may be displayed on an emergency responder's emergency responder terminal in accordance with one or more embodiments of the present disclosure.

In still a further example, Mission Route Component 1718 (or similar component) may be configured to: determine one or more routes providing possible paths of travel that an emergency responder may follow in order to reach a given (or selected) unit of equipment. Mission route component 1718 may draw upon map information stored within system 1000 (e.g., within electronic storage 1730) or otherwise accessible to system 1000 (e.g., via a map database accessible online, via information communicated via an emergency vicinity component 1500) to determine and/or provide a route upon which the emergency responder may travel to reach the unit of equipment. Such map information may be based on building information (e.g., stairwell locations, elevator bays, escalators), online map information (e.g., google maps information), and information from one or more of the emergency vicinity components. The route provided may be a walking route, driving route, bicycle route, or any route suitable for any mode of travel (escalator route, elevator route, etc.) or any combination of the foregoing. The determined route or routes may be displayed as an overlay on a portion of a real-world scene captured by a camera component 1706 of an emergency responder terminal, or may be provided as a list of visual instructions, a list of audio instructions, or in any other format or manner desired. In some embodiments, multiple routes are determined and provided to an emergency responder via the emergency responder's emergency responder terminal 1200. Turning now to FIG. 4, this figure illustrates another example augmented reality presentation that may be displayed on an emergency responder's emergency responder terminal in accordance with one or more embodiments of the present disclosure. The presentation may include display objects associated with users in different locations within building 1970. As shown, the display objects themselves may include one or more details about the registered users associated with them. For example, display objects 1971-1975 may include a distance measure and an altitude measure for individual users. Additionally, the size of the display objects may be keyed to the distance measure. For instance, the user associated with display object 1971 is 0.20 miles from the emergency responder holding the terminal shown, and the user associated with display object 1975 is 0.22 miles from the emergency responder holding the terminal shown. Since the user associated with display object 1971 is closer to the emergency responder holding the terminal shown than the user associated with display object 1975, display object 1971 is larger than display object 1975. Thus, the augmented reality display objects may exhibit a visual feature that provides depth cues to indicate to the emergency responder how close a given user is relative to other users (i.e., user associated with display object 1971 is closer than user associated with display object 1975). Similar visual features may be employed with respect to display objects associated with equipment. Further as shown in FIG. 4, the presentation may include a compass indication display object 1976 and/or altitude indication 1977 based on the position and/or orientation of the terminal shown.

Figure 5:
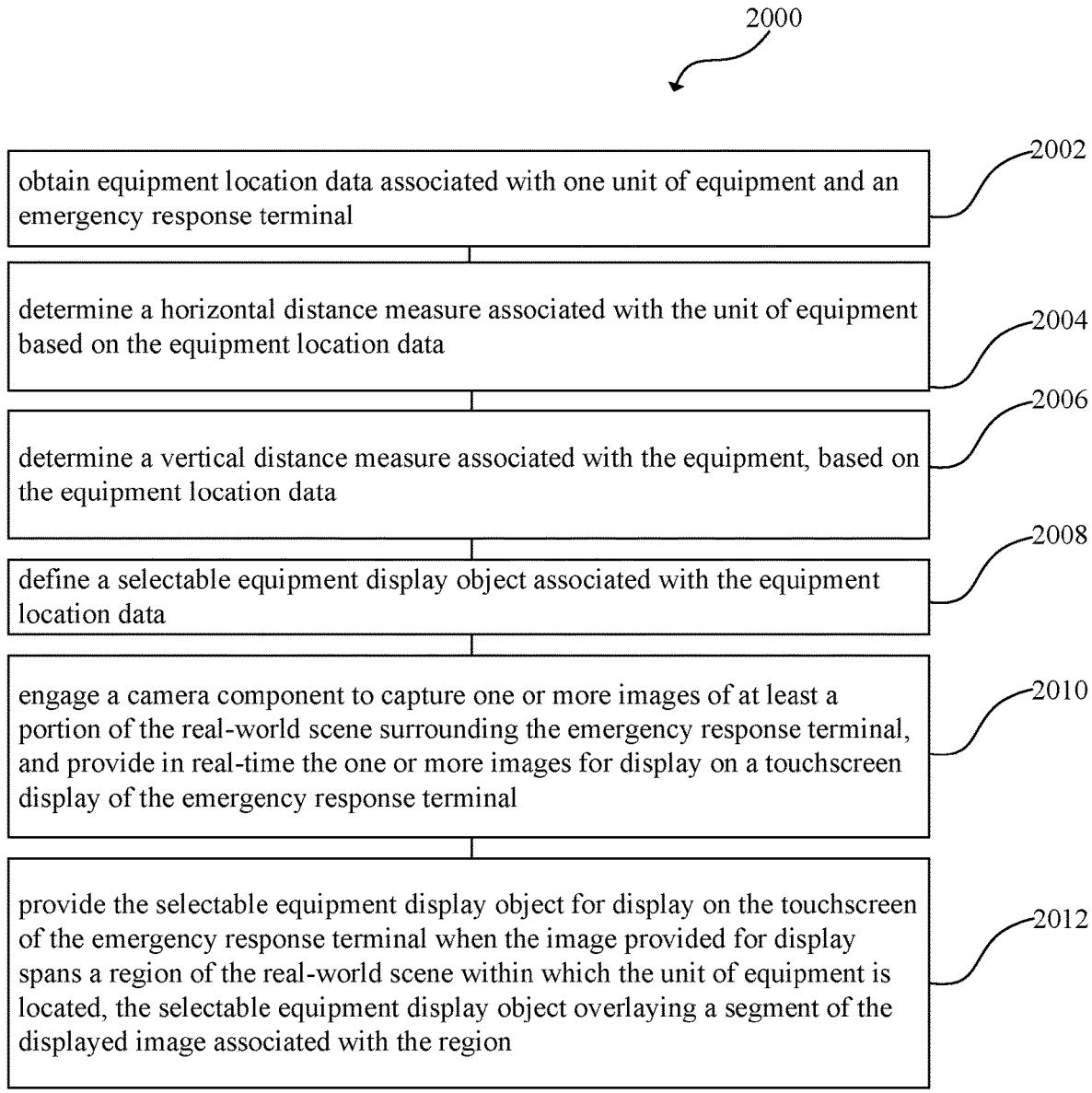
FIG. 5 is a flow diagram illustrating an example method in accordance with one or more embodiments of the present disclosure.

FIG. 5 is a flow diagram illustrating an example method 2000 that may be implemented by system 1000 in accordance with one or more embodiments of the present disclosure. As shown, at operation 2002 method 2000 may obtain equipment location data associated with one unit of equipment and an emergency response terminal. At operation 2004, method 2000 may determine a horizontal distance measure associated with the unit of equipment based on the equipment location data. At operation 2006, method 2000 may determine a vertical distance measure associated with the equipment, based on the equipment location data. At operation 2008, method 2000 define a selectable equipment display object associated with the equipment location data.

At operation 2010, method 2000 may engage a camera component to capture one or more images of at least a portion of the real-world scene surrounding the emergency response terminal, and provide in real-time the one or more images for display on a touchscreen display of the emergency response terminal. At operation 2012, method 2000 may provide the selectable equipment display object for display on the touchscreen of the emergency response terminal when the image provided for display spans a region of the real-world scene within which the unit of equipment is located, the selectable equipment display object overlaying a segment of the displayed image associated with the region.

Figure 6:
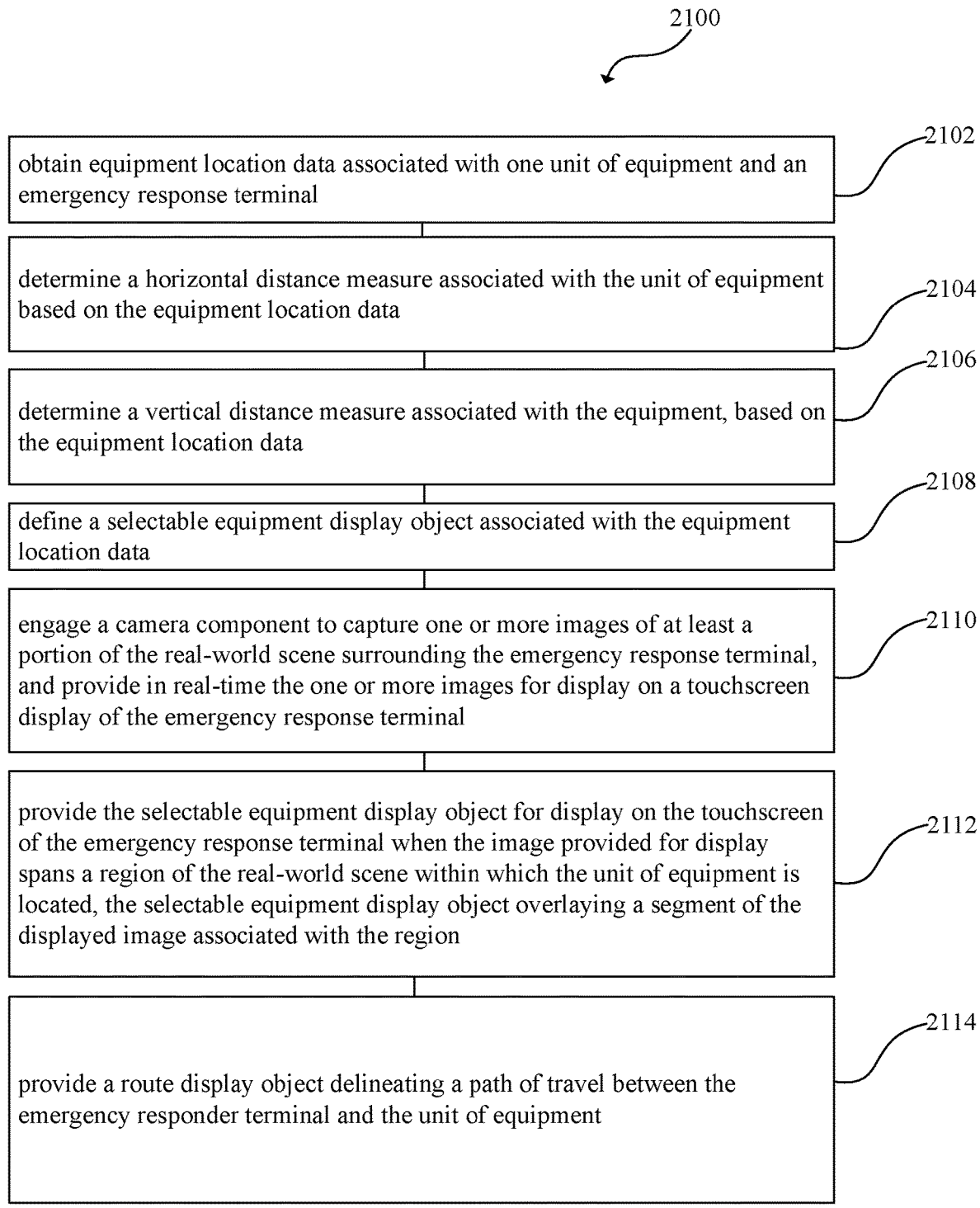
FIG. 6 is a flow diagram illustrating an example method in accordance with one or more embodiments of the present disclosure.

FIG. 6 is a flow diagram illustrating another example method 2100 that may be implemented by system 1000 in accordance with one or more embodiments of the present disclosure. As shown, at operation 2102 method 2100 may obtain equipment location data associated with one unit of equipment and an emergency response terminal. At operation 2104, method 2100 may determine a horizontal distance measure associated with the unit of equipment based on the equipment location data. At operation 2106, method 2100 may determine a vertical distance measure associated with the equipment, based on the equipment location data. At operation 2108, method 2100 define a selectable equipment display object associated with the equipment location data. At operation 2110, method 2100 may engage a camera component to capture one or more images of at least a portion of the real-world scene surrounding the emergency response terminal, and provide in real-time the one or more images for display on a touchscreen display of the emergency response terminal. At operation 2112, method 2100 may provide the selectable equipment display object for display on the touchscreen of the emergency response terminal when the image provided for display spans a region of the real-world scene within which the unit of equipment is located, the selectable equipment display object overlaying a segment of the displayed image associated with the region. At operation 2114, method 2100 may provide a route display object delineating a path of travel between the emergency responder terminal and the unit of equipment.

Referring to FIGS. 1-7 collectively, although these illustrate example embodiments with components, elements and circuits partitioned in the depicted manner, it will be appreciated by one of ordinary skill in the art that various components and circuits of system 1000 (including any one or more elements and subsystems related thereto, individually or collectively) and described herein may be implemented utilizing any form of hardware, software, or a combination thereof. For example, one or more processors, controllers, ASICs, PLAs, PALs, CPLDs, FPGAs, logical components, software routines or other mechanisms, including associated memory, might be used to implement one or more components or circuits in embodiments of system 1000 (including any one or more elements and subsystems related thereto) described in the present disclosure. In embodiments, the various components and circuits described herein might be implemented as discrete components or the functions and features described can be shared in part or in total among two or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, in various embodiments these features and functionality can be shared among one or more common software and hardware elements, and such description shall not require or imply that separate hardware or software components are used to implement such features or functionality.

Figure 7:
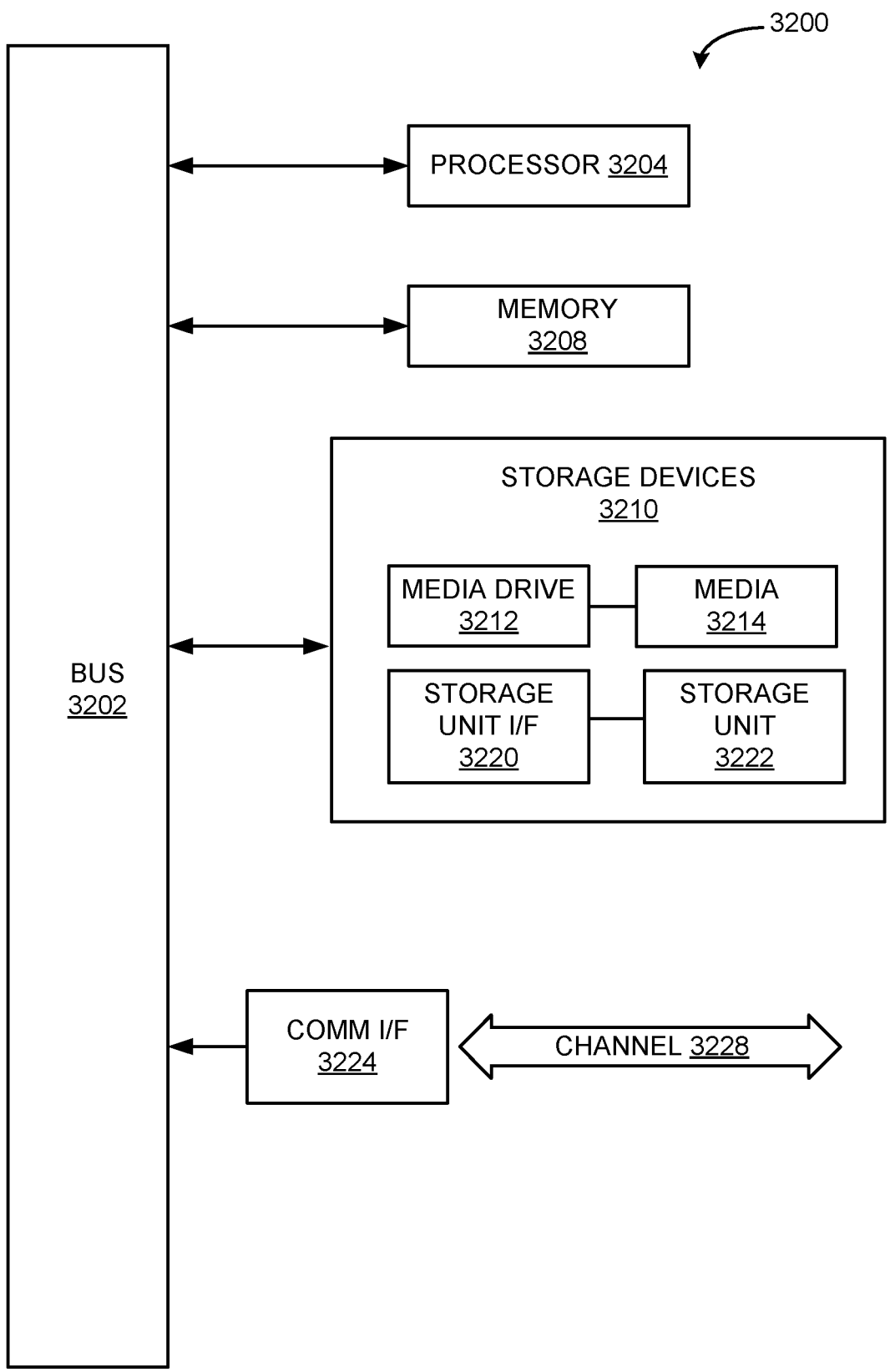
FIG. 7 illustrates an example computing component that may be used in implementing various features of embodiments of the disclosed technology.

As used herein, the term "component" might describe a given unit of functionality that can be performed in accordance with one or more embodiments of the technology disclosed herein. As used herein, a component might describe a given unit of hardware that can be utilized, alone or in conjunction with software, to perform an operation (e g, a camera component might include a CMOS array, an analog-to-digital converter, a sampling circuit, and software to create a permanent or temporary digital image information, for instance). Thus, as used herein, a component might comprise or be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components, or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing component or engine capable of carrying out the functionality described with respect thereto. One such example computing component is shown in FIG. 7. Various embodiments are described in terms of this example-computing component 3200. After reading this description, it will become apparent to a person skilled in the relevant art how to implement the technology using other computing modules or architectures.

Referring now to FIG. 7, computing component 3200 may represent, for example, computing or processing capabilities found within desktop, laptop and notebook computers; hand-held computing devices (PDA's, smart phones, cell phones, palmtops, etc.), mainframes, supercomputers, workstations or servers; or any other type of special-purpose or general-purpose computing devices as may be desirable or appropriate for a given application or environment. Computing component 3200 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 3200 might include, for example, one or more processors, controllers, control modules, or other processing devices, such as a processor 3204. Processor 3204 might be implemented using a general-purpose or special-purpose processing engine such as, for example, a microprocessor, controller, or other control logic. In the illustrated example, processor 3204 is connected to a bus 3202, although any communication medium can be used to facilitate interaction with other components of computing module 3200 or to communicate externally.

Computing component 3200 might also include one or more memory modules, simply referred to herein as main memory 3208. For example, preferably random access memory (RAM) or other dynamic memory, might be used for storing information and instructions to be executed by processor 3204. Main memory 3208 might also be used for storing temporary variables or other intermediate information during execution of instructions to be executed by processor 3204. Computing component 3200 might likewise include a read only memory ("ROM") or other static storage device coupled to bus 3202 for storing static information and instructions for processor 3204.

The computing component 3200 might also include one or more various forms of information storage mechanism 3210, which might include, for example, a media drive 3212 and a storage unit interface 3220. The media drive 3212 might include a drive or other mechanism to support fixed or removable storage media 3214. For example, a hard disk drive, a floppy disk drive, a magnetic tape drive, an optical disk drive, a CD or DVD drive (R or RW), or other removable or fixed media drive might be provided. Accordingly, storage media 3214 might include, for example, a hard disk, a floppy disk, magnetic tape, cartridge, optical disk, a CD or DVD, or other fixed or removable medium that is read by, written to or accessed by media drive 3212. As these examples illustrate, the storage media 3214 can include a computer usable storage medium having stored therein computer software or data.

In alternative embodiments, information storage mechanism 3210 might include other similar instrumentalities for allowing computer programs or other instructions or data to be loaded into computing component 3200. Such instrumentalities might include, for example, a fixed or removable storage unit 3222 and an interface 3220. Examples of such storage units 3222 and interfaces 3220 can include a program cartridge and cartridge interface, a removable memory (for example, a flash memory or other removable memory module) and memory slot, a PCMCIA slot and card, and other fixed or removable storage units 3222 and interfaces 3220 that allow software and data to be transferred from the storage unit 3222 to computing component 3200.

Computing component 3200 might also include a communications interface 3224 (e.g., communications component 1722 shown in FIG. 2). Communications interface 3224 might be used to allow software and data to be transferred between computing component 3200 and external devices. Examples of communications interface 3224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 3224 might typically be carried on signals, which can be electronic, electromagnetic (which includes optical) or other signals capable of being exchanged by a given communications interface 3224. These signals might be provided to communications interface 3224 via a channel 3228. This channel 3228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 3208, storage unit 3220, media 3214, and channel 3228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 3200 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like: the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. An emergency response system (ERS) comprising:
   a non-transitory computer readable medium storing machine readable instructions which when executed cause the ERS to:
   acquire equipment location data for one or more units of equipment located in a zone of interest, wherein each of the one or more units of equipment is operatively coupled with: a first GPS circuit, a first altimeter circuit, and a first communications circuit;
   acquire emergency responder terminal location data for an emergency responder terminal, wherein the emergency responder terminal is operatively coupled with: a second GPS circuit, a second altimeter circuit, a camera component, a touchscreen display, a second communication circuit, a processing engine, and a memory;
   determine a horizontal distance measure between the emergency responder terminal and each of the one or more units of equipment, the horizontal distance measure computed from the acquired equipment location data and the acquired emergency responder terminal location data;
   determine a vertical distance measure between the emergency responder terminal and the one or more units of equipment, the vertical distance measure computed from the acquired equipment location data and the acquired emergency responder terminal location data;
   engage the camera component of the emergency responder terminal to capture video of at least a portion of the surrounding real-world scene, and stream such video for display on the touchscreen display of the emergency responder terminal;
   provide an equipment display object for display on the touchscreen of the emergency responder terminal such that, when video content streamed for display on the touchscreen display spans a region of the real-world scene within which a unit of equipment of the one or more units of equipment is located, the equipment display object is displayed as an overlay on top of a segment of the video display associated with the acquired equipment location data; whereupon selection of the equipment display object causes one or more equipment details to be displayed on the touchscreen display, the equipment details including an equipment type;
   obtain updated equipment location data and updated emergency responder terminal location data on a periodic basis, and correspondingly adjust a position of the equipment display object on the touchscreen display of the emergency responder terminal based on (a) the updated equipment location data, (b) updated emergency responder terminal location data, and (c) and changes in facing direction of the camera component of the emergency responder terminal.

2. The ERS of claim 1, wherein the non-transitory computer readable medium further stores machine readable instructions that, when executed, cause the ERS to:
   provide for display on the touchscreen display a route display object representing a suggested path of travel between the emergency responder terminal and the unit of equipment associated with a selected equipment display object.

3. The ERS of claim 2, wherein the route display object is generated by an emergency management entity communicatively coupled with but physically detached from the emergency responder terminal.

4. The ERS of claim 1, wherein the equipment details associated with the unit of equipment further includes: an equipment status.

5. The ERS of claim 2, wherein the route display object is associated with an indication of an estimated amount of time it will take to travel along the route from a current location of the emergency responder terminal to a current location current location of the unit of equipment associated with the selected equipment display object.

6. The ERS of claim 1, wherein the non-transitory computer readable medium further stores machine readable instructions that, when executed, cause the ERS to:
   obtain updated equipment location data and updated emergency responder terminal location data on a continuous basis, and correspondingly adjust a position of the equipment display object on the touchscreen display of the emergency responder terminal based on (a) the updated equipment location data, (b) updated emergency responder terminal location data, and (c) and changes in facing direction of the camera component of the emergency responder terminal.

7. The ERS of claim 1, wherein the non-transitory computer readable medium further stores machine readable instructions that, when executed, cause the ERS to:
   obtain updated equipment location data and updated emergency responder terminal location data upon identifying a manual selection by a user, and correspondingly adjust a position of the equipment display object on the touchscreen display of the emergency responder terminal based on (a) the updated equipment location data, (b) updated emergency responder terminal location data, and (c) and changes in facing direction of the camera component of the emergency responder terminal.

8. The ERS of claim 1, wherein the equipment location data is obtained from one or more of: components located inside a housing of a unit of equipment of the one or more units of equipment, and components located outside a housing of a unit of equipment of the one or more units of equipment.

9. The ERS of claim 8, wherein the components located inside the housing of the unit of equipment of the one or more units of equipment include one or more of a GPS sensor, an altimeter, a Bluetooth beacon, and RFID tag, and a pressure sensor.

10. The ERS of claim 8, wherein the components located outside the housing of the unit of equipment of the one or more units of equipment include one or more emergency vicinity components located in the vicinity of the scene of an ongoing emergency.

11. The ERS of claim 8, wherein the components located outside the housing of the unit of equipment of the one or more units of equipment include one or more target vicinity components located in the vicinity of a scene of an ongoing emergency, wherein the target vicinity components include a proximity beacon configured to communicate with a target terminal.

12. The ERS of claim 1, wherein the horizontal distance measure between the emergency responder terminal and a given unit of equipment comprises an estimate of the shortest horizontal distance between the emergency responder terminal and the given unit of equipment.

13. The ERS of claim 2, wherein the horizontal distance measure between the emergency responder terminal and a specified unit of equipment comprises an estimate of the total travel distance along preestablished paths to reach the unit of equipment.

14. The ERS of claim 1, wherein the vertical distance measure is based on an estimate of an altitude of the target terminal.

15. The ERS of claim 1, wherein the vertical distance measure is an estimate of the relative difference between an altitude measure of the unit of equipment of the one or more units of equipment and an altitude measure of the emergency responder terminal.

16. The ERS of claim 2, wherein the route display object is provided upon selection of the equipment display object.

17. The ERS of claim 1, wherein one or more of a shape, a color, and a size of each of a plurality of equipment display objects is defined based on one or more of a latitude measure, a longitude measure, an altitude measure, a route, an equipment detail, and an indication of a status associated with each corresponding unit of equipment of the one or more units of equipment.

* * * * *